United States Patent [19]
Kimura

[11] Patent Number: 5,507,032
[45] Date of Patent: Apr. 9, 1996

[54] MULTIPROCESSOR I/O REQUEST CONTROL SYSTEM FORMING DEVICE DRIVE QUEUE AND PROCESSOR INTERRUPT QUEUE FROM ROWS AND CELLS OF I/O REQUEST TABLE AND INTERRUPT REQUEST TABLE

[75] Inventor: Makoto Kimura, Inzaimachi, Japan

[73] Assignee: Fujitsu Limited, Kawasaki, Japan

[21] Appl. No.: 166,799

[22] Filed: Dec. 2, 1993

Related U.S. Application Data

[63] Continuation of Ser. No. 667,337, Mar. 11, 1991, abandoned.

[30] Foreign Application Priority Data

Mar. 9, 1990  [JP]  Japan ................................. 2-059070

[51] Int. Cl.[6] ............................. G06F 13/00; G06F 9/46; G06F 13/12
[52] U.S. Cl. .......................... 395/826; 395/859; 395/869; 364/DIG. 1; 364/230.2; 364/242.2; 364/DIG. 2; 364/941.6; 364/942.5
[58] Field of Search ..................... 395/826, 823, 395/825, 859, 860, 868

[56] References Cited

U.S. PATENT DOCUMENTS

| | | | |
|---|---|---|---|
| 4,207,609 | 5/1980 | Luiz et al. ............................... | 395/275 |
| 4,271,468 | 6/1981 | Christensen et al. .................... | 395/275 |
| 4,276,594 | 6/1981 | Morley ................................... | 395/800 |
| 4,396,984 | 8/1983 | Videki .................................... | 395/275 |
| 4,562,533 | 12/1985 | Hodel et al. ............................ | 395/200 |
| 4,783,730 | 11/1988 | Fischer .................................... | 395/275 |
| 4,888,691 | 12/1989 | George et al. .......................... | 395/700 |

FOREIGN PATENT DOCUMENTS

| | | |
|---|---|---|
| 0029394 | 5/1981 | European Pat. Off. . |
| 0059838 | 9/1982 | European Pat. Off. . |
| 53-33027 | 3/1978 | Japan . |

OTHER PUBLICATIONS

"Queue–driven device driver algorithm", *IBM Technical Disclosure Bulletin*, vol. 29, No. 4, Sep. 1986, pp. 1716–1717.

Primary Examiner—Thomas O. Lee
Assistant Examiner—D. Dinh
Attorney, Agent, or Firm—Staas & Halsey

[57] ABSTRACT

An input/output request control system in a multi-processor system includes a plurality of information processing modules (PM). The system comprises a plurality of input/output adapters (ADP) commonly used by each of said information processing modules and a plurality of input/output devices (DVC) divided into groups, each group controlled by one of the input/output adapters. An input/output request maintaining table (LDVC) manages input/output requests from respective information processing modules for each of the input/output devices controlled by said information processing modules by using a queue. Input/output requests from respective information processing modules are processed based on the state of the input/output request maintaining table and the input/output devices.

15 Claims, 21 Drawing Sheets

Fig. 5A  INPUT/OUTPUT COMMAND

| OP | ADP# | DVC# |
|----|------|------|
| Parameter Adrs ||| |

Fig. 5B  PARAMETER

| Command Adrs |
|--------------|
| Status Blk Adrs |

Fig. 5C  COMMAND

| OP | flg | Data Count |
|----|-----|------------|
| LSU Adrs |||

CHAIN

Fig. 5D  STATUS BLOCK

| Status | REMAINED Data C. |
|--------|------------------|
| Last Command Adrs ||

| Status |  |
|---|---|
| Active PM # (LDVC #) | |
| Next PDVC | Prev. PDVC |

Fig. 9

PMIC (PM Interruption

Control table)

| Status |  |
|---|---|
| Active  LDVC # | |
| Next PMIC# | Prev PMIC# |

MULTIPROCESSOR I/O REQUEST CONTROL SYSTEM FORMING DEVICE DRIVE QUEUE AND PROCESSOR INTERRUPT QUEUE FROM ROWS AND CELLS OF I/O REQUEST TABLE AND INTERRUPT REQUEST TABLE

This application is a continuation of application Ser. No. 07/667,337, filed Mar. 11, 1991, now abandoned.

FIELD OF THE INVENTION

The present invention relates to a multi-processor system formed of a plurality of information processing modules, and more particularly to a control system for effectively processing an input and output request from respective information processing modules and for effectively processing interruption requests from respective input and output devices.

In the following explanation, respective elements of a device are designated by the following abbreviations.

PM: information processor module
DVC: input/output device
ADP: input/output adapter
IOC: input/output controller
IOBUS: input/output bus for connecting PM and ADP
DVBUS: device bus for connecting ADP and DVC
CPU: information processing unit in PM
MSU: memory storage unit in PM
PIBC: PM-IOBUS connector
PMBUS: PM bus connecting CPU, MSU and PIBC in PM
AIBC: ADP-IOBUS connector
ADBC: ADP-DVBUS connector
APU: ADP processing unit
CSU: control storage unit in ADP
LDVC: logical input/output request holding table for a PM-DVC correspondence provided in CSU
PDVC: physical input/output request holding table corresponding to DVC
PMIC: PM interruption control table

DESCRIPTION OF THE RELATED ART

Generally speaking, where a plurality of PMs are provided, it is necessary for a system to hold data such as a data base or a user file as one source. Thus, it is usually stored in a DVC (input/output device) such as a magnetic disc and is commonly used by a plurality of PMs. When a PM accesses a first DVC the DVC is already executing an input/output request from a second PM, the first PM must wait until the previous request is completed. Thus, it is necessary to reissue the input/output request when the DVC becomes available. This process is performed by software in the first PM. However, this results in overhead caused by an interruption or input/output request. When many PMs are provided, and the first PM reissues the input/output request, a third PM may already be using the DVC. Therefore, the number of reissuances of the input/output requests increases, but the overall system capability does not increase in spite of the increased number of PMs.

FIG. 1 shows an example of a conventional multi-processor system comprising PMs (information processing modules) 1, ADPs (input/output adapters) 2, DVCs (input/output devices) 3 and an IOC (input/output controller) 6. 8 to 16 PMs, for example, are provided. PMs 1 and ADPs 2 are provided on a one-to-one basis and all the DVCs 3 are controlled by a single common IOC 6. Respective PMs 1 and ADPs 2 operating under the supervision of PMs 1 access DVCs 3 through the single common IOC 6.

The conventional system shown in FIG. 1 has recently been used in general purpose computers. Respective ADPs 2 are separately provided such that each is exclusively used by a corresponding PM 1. IOC 6 for controlling an input/output of respective DVCs 3 is provided with a port to be connected to a plurality of ADPs 2.

In this case, ADP 2 is provided exclusively for a predetermined PM 1 and always receives an input/output request from the PM 1. ADP 2 notifies IOC 6 of the input/output request.

Where the requested DVC 3 is operating in accordance with an input/output request by another PM (through ADP), IOC 6 notifies the ADP 2 performing the input/output request that the DVC 3 is being used and the DVC 3 did not receive the input/output request from the PM 1. ADP 2 reports this status (designating that DVC 3 is being used) to PM I through an interruption operation and completes the input/output process.

The software of the PM 1 reissues the input/output request after waiting a predetermined time after receiving the report. When DVC 3 returns a response stating that a DVC 3 has become available, some IOCs 6 have a function of reporting this availability through an interruption. In this case, the software of PM 1 reissues an input/output request after receiving the interruption.

An ADP 2 is also available with a function of waiting for the DVC 3 to become available and ADP 2 reissues the input/output request, thereby decreasing the PM's software and overhead.

Conventionally, the availability of a DVC 3 upon a reissuance of an input/output request is not certain. With an increase in the number of PMs 1 and the rate of DVC's being used, the reissuing frequency increases. As the reissuance process is not necessary in the original system, the increase of the reissuance process causes a system capability to be lowered.

Further, where PMs 1/ADPs 2 of different models use a common DVC 3, the number of times the DVC is required to perform the reissuance process varies between different models. Even when these different PMs simultaneously start the reissuance process, the reissuance of the input/output request by a slower PM 1 has a high possibility of failure, thereby greatly deteriorating the capability of the process of the PM 1.

FIG. 2 shows another conventional system in which a communication path 7 is provided between PM 1, and respective PMs 1 have a single ADP 2 and a plurality of DVCs 3.

In this system, a group of DVCs 3 as well as an ADP 2 are exclusively accessed by a particular PM 1. Where a particular PM 1 needs to access a DVC 3 which is not under its supervision, the particular PM 1 asks another PM 1 to which the DVC 3 is connected to perform an input/output operation through a communication path 7 between PMs 1, and sends and receives the transfer data through this communication path 7.

In this system, only one PM 1 is capable of issuing an input/output request to a certain DVC 3 and the software of the PM 1 can always control an operating state of the DVC 3. Therefore, the system shown in FIG. 2 can prevent the occurrence of a state in which the DVC is being used and a reissuance of the input/output request, which are caused in the conventional system shown in FIG. 1. However, in this system, the PM 1 which is asked to issue the input/output request consumes a memory resource and an overhead of a communication between PMs. Thus, this system is disadvantageous compared with a structure in which a direct access path is provided from the PM 1 to the DVC 3.

In particular, the overhead of the communication between PMs greatly depends on the frequency of access to a DVC 3 which is under the control of another PM 1. Thus, it is necessary to decrease the volume of communication between PMs by using a special method of storing data in respective DVCs or by limiting an application to be processed to a special purpose and use, thereby preventing a decrease in system capability. This method is very disadvantageous in that it is difficult to build a system with high performance and the purpose and use of the system is limited, making it unsuitable as a general purpose system.

If a DVC makes an interrupt request to a PM, when the PM is already executing an interrupt request from another DVC, it must wait until this request is completed. Thus, it is necessary to reissue the interrupt request when the PM becomes available. Where a PM cannot accept a request of an interruption because the interrupt is masked by the software, it is also necessary to reissue the interrupt request. This process can be performed by firmware in an adapter. As I/O requests to a plurality of DVCs transmitted from a plurality of PMs are simultaneously processed in the adapter, it is necessary to deal in parallel with the completion interrupts which are made upon the completion of the I/O requests. However, this cannot be effectively achieved by the conventional art.

SUMMARY OF THE INVENTION

An object of the present invention is to maintain direct access from respective PMs to a DVC and decrease overheads caused by reissuance of an input/output request in PM 1, thereby preventing the processing performance of a multi-processor system from being decreased.

Another object of the present invention is to decrease an occurrence of a state of waiting for an interrupt to other PMs depending on whether the interrupt to a particular PM is accepted, when the interrupt request from respective DVCs to the PM is processed, thereby preventing the processing performance of a multi-processor system from being decreased.

A feature of the present invention resides in an input/output request control system in a multi-processor system including a plurality of information processing modules (PM) comprising: a plurality of input/output adapters (ADP) commonly used by each of the information processing modules; a plurality of input/output devices (DVC) being divided to be controlled by respective input/output adapters; means for providing an input/output request maintaining table (LDVC) for managing input/output request from respective information processing modules for each of said input/output devices controlled by said information processing module by using a queue; and means for processing input/output requests of respective information processing modules based on a state of said input/output request maintaining table and the input/output devices.

Another feature of the present invention resides in an interrupt request control system in a multi-processor system including a plurality of information processing modules (PM) comprising: a plurality of input/output adapters (ADP) commonly used by each information processing modules; a plurality of input/output devices (DVC) being divided in groups controlled by respective input/output adapters; means for providing an interrupt request maintaining table (LDVC) for managing interrupt requests from respective input/output devices to each of said information processing modules by using a queue; and means for processing interrupt requests of respective input/output devices based on a state of said interrupt request maintaining table and the input/output devices.

BRIEF DESCRIPTION OF DRAWINGS

FIGS. 5A–5D are explanatory view of a control information format in the first embodiment of the present invention, FIG. 9 is an explanatory view of a format of the PDVC.

FIG. 18 is an explanatory view of a format of the PMIC;

DESCRIPTION OF THE PREFERRED EMBODIMENT

Figure 3:
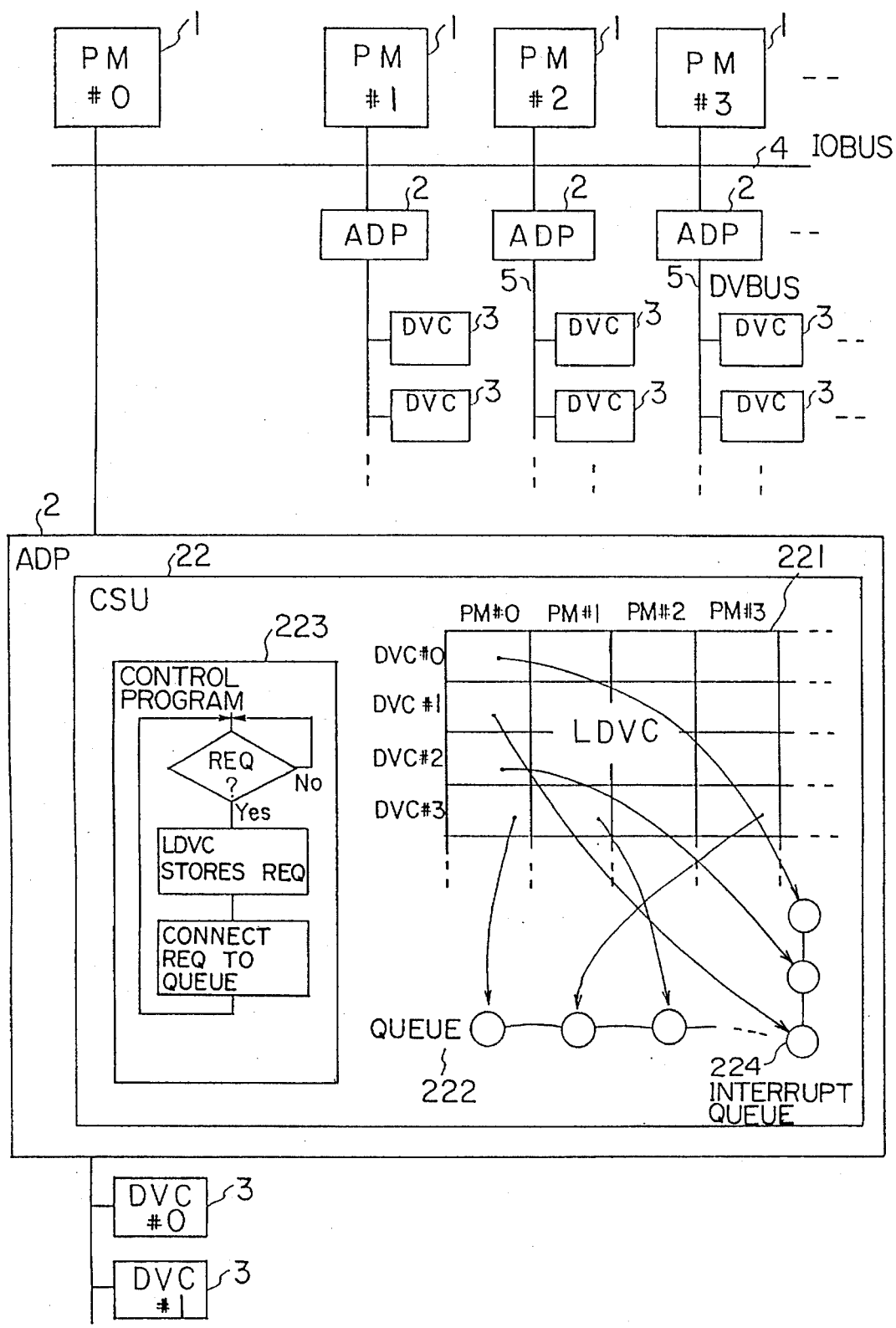
FIG. 3 shows a block diagram for explaining a principle of the present invention.

FIG. 3 shows the first principle of the present invention. Respective PMs 1 (information processing modules) commonly use a plurality of ADPs (input/output adapters) 2. Respective ADPs 2 have their own DVCs 3 which are under their control. Access to any of the DVCs 3 from PMs 1 is made through an ADP 2 to which the DVC 3 belongs. The DVC 3 to be accessed will be referred to as the discretional DVC3. Means for managing input/output requests made to the discretional DVC 3 by respective PMs 1 using a queue of PMs 1 per DVC 3 is provided for respective ADPs 2, A plurality of PMs (Information processing modules) 1 constitute a multi-processor system, Adapters 2 process an input/output request from respective PMs 1. A DVC 3 may be a magnetic disc device or a magnetic tape device, for example. IOBUS 4 connects a discretional PM 1 to a discretional ADP 2 and transmits data and control information. DVBUS (device bus) 5 connects respective ADPs 2 to a plurality of DVCs 3 which are under their control and transmits data control information. A CSU (control storage unit) 22 is provided in each ADP 2. CSU 22 comprises an input/output request holding table LDVC 221 for holding an input/output requests from PMs (#0, #1 . . . ) 1 to respective DVCs 3 (#0, #1 . . . ) which are controlled by respective ADPs 2. Input/output request holding table LDVC 221 has a queue management function. Queue 222 relates to the LDVC 221 for managing process sequence of input/output requests from respective PMs 1 with regard to respective DVCs 3. Control program 223 manages input/output requests from respective PMs by using LDVC 221 an APU (not shown in FIG. 3) processes the input/output requests in the order in which they appear in queue 222 when the DVC 3 is available.

As shown in FIG. 3, when a PM 1 produces an input/output request to a DVC 3, the PM 1 issues an input/output request to an ADP 2 to which the DVC 3 is connected as shown in the control program. A APU of the ADP 2 stores the input/output request from the PM 1 in the LDVC 221 corresponding to the PM/DVC. The ADP 2 connects the input/output request to the drive queue 222 which is provided for each of the DVCs 3 and processes the requests for the DVC 3 in the order of arrival of the input/output requests. When input/output requests are made to a plurality of DVCs 3 attached to one ADP 2, the DVCs 3 are also queued to perform processes on the input/output requests in a sequential manner.

Figure 1:
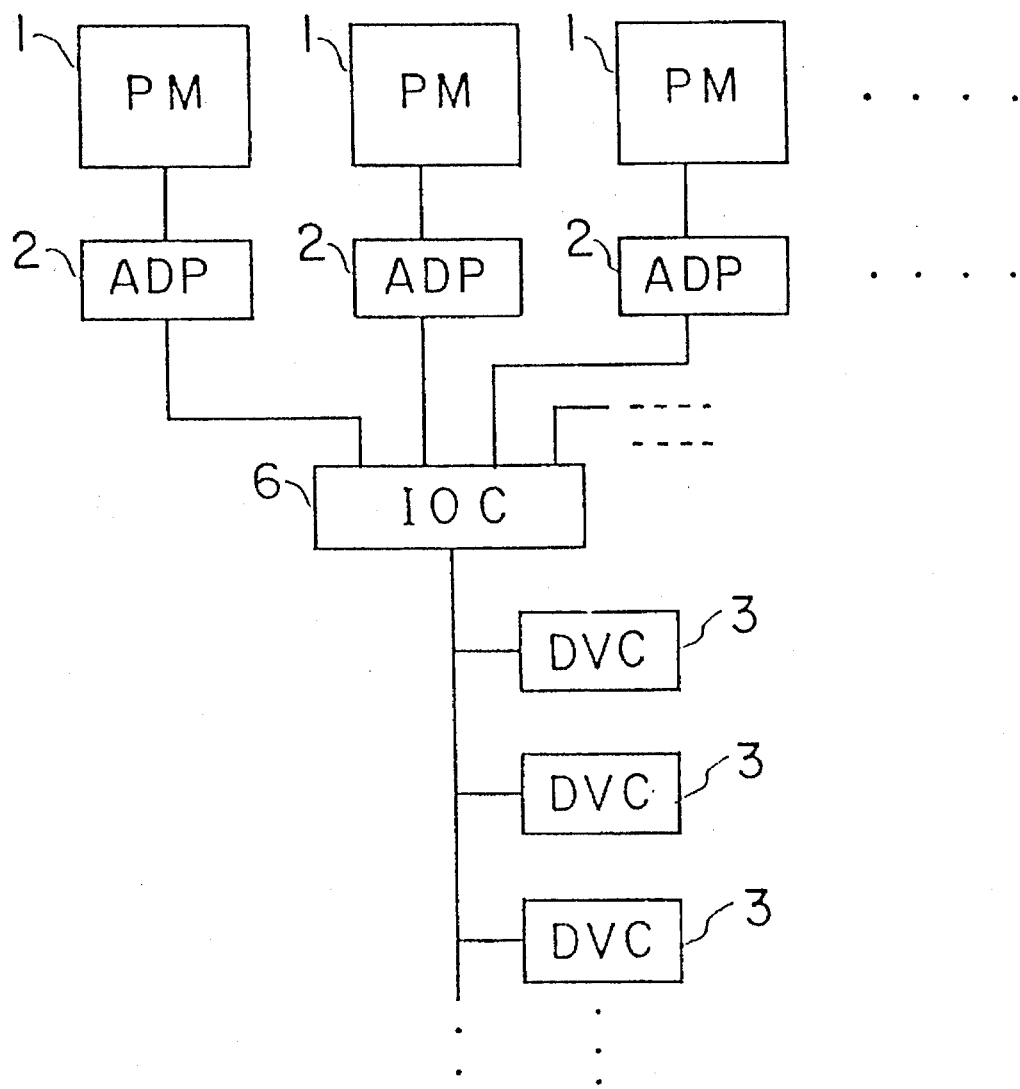
FIG. 1 is a block diagram of a conventional computer system.
Figure 2:
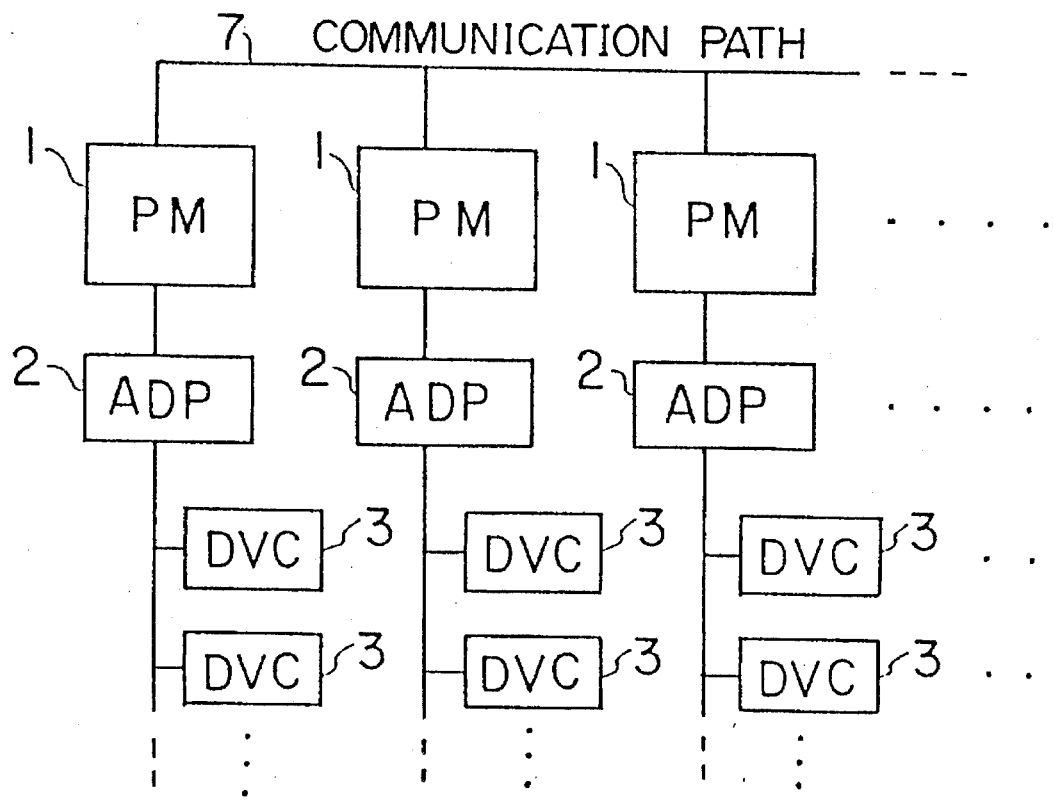
FIG. 2 is a structural view of another conventional computer system.

Thus, the above structure prevents respective PMs 1 from judging that the DVCs 3 are being used. ADP 2 needs not reissue a useless input/output request to DVCs 3 and can avoid overhead caused by the reissuance of the input/output request. Further, as a failure does not occur upon the reissuance of the input/output request, an extreme decrease in performance resulting from varying performance levels of PMs 1 does not occur. The input/output operation of the DVC 3 is directly conducted by respective PMs 1 with regard to an issuance of input/output request as well as data transfer in the same manner as the conventional system shown in FIG. 1. Therefore, the problem of a communication overhead among PMs 1 is removed and optimization of the arrangement of data is achieved, thereby providing a high-performance multi-processor system.

According to the second principle of the present invention, the PMs 1 commonly use a plurality of ADPs 2. Respective ADPs 2 have their own DVCs 3. Access to a discretional DVC 3 from a PM 1 is made through an ADP 2 to which the discretional DVC 3 belongs. Means for managing interrupt requests made to the PM 1 by discretional DVCs 3 using a queue of DVCs 3 per PM is provided for respective ADPs 2.

CSU 22 comprises an input/output request holding table LDVC 221 for holding an interrupt request from DVCs (#0, #1 . . . ) 1 to respective PMs 3 (#0, #1 . . . ) which are controlled by respective ADPs 2. The input/output request holding table LDVC 221 for holding an interrupt request is the same as the input/output request holding table for the input/output request. Input/output request holding table LDVC 221 has a queue management function. Queue 224 relates to the LDVC 221 for managing process sequence of interrupt requests from respective DVCs 3 with regard to respective PMs 1. Control program 223 manages interrupt requests from respective DVCs 3 by using LDVC 221 and the APU processes the interrupt requests in the order in which they are represented in queue 224 when the PM 1 is available. The queues comprise drive queue 222 for linking cells in a row direction of the LDVC 221 and interrupt queue 224 for linking cells in a column direction of the LDVC 221.

As shown in FIG. 3, when a DVC 3 produces an interrupt request to a PM 1, the DVC 3 issues an interrupt request (REQ) to an ADP 2 to which the PM 1 is connected as shown in the control program. The APU of the ADP 2 stores the interrupt request from the DVC 3 in the LDVC corresponding to the DVC and PM. The ADP 2 queues the interrupt request in the interrupt queue which is provided for each of the PMs I and performs a process for the PM 1 in the order of arrival of the interrupt requests. When interrupt requests are made to a plurality of PMs 1, the PMs 1 are queued to perform processes in a sequential manner.

Thus, the above structure decreases an occurrence of a state of waiting for an interrupt to other PMs 1 depending on whether the interrupt to a particular PM 1 is accepted, when the interrupt request from respective DVCs 3 to the PM 1 is processed, thereby preventing the processing performance of a multiprocessor system from being decreased.

As I/O requests to a plurality of DVCs 3 transmitted from a plurality of PMs 1 are simultaneously processed by the ADP 2, the ADP 2 can deal in parallel with the completion interrupts which are made upon completion of the I/O requests.

Figure 4:
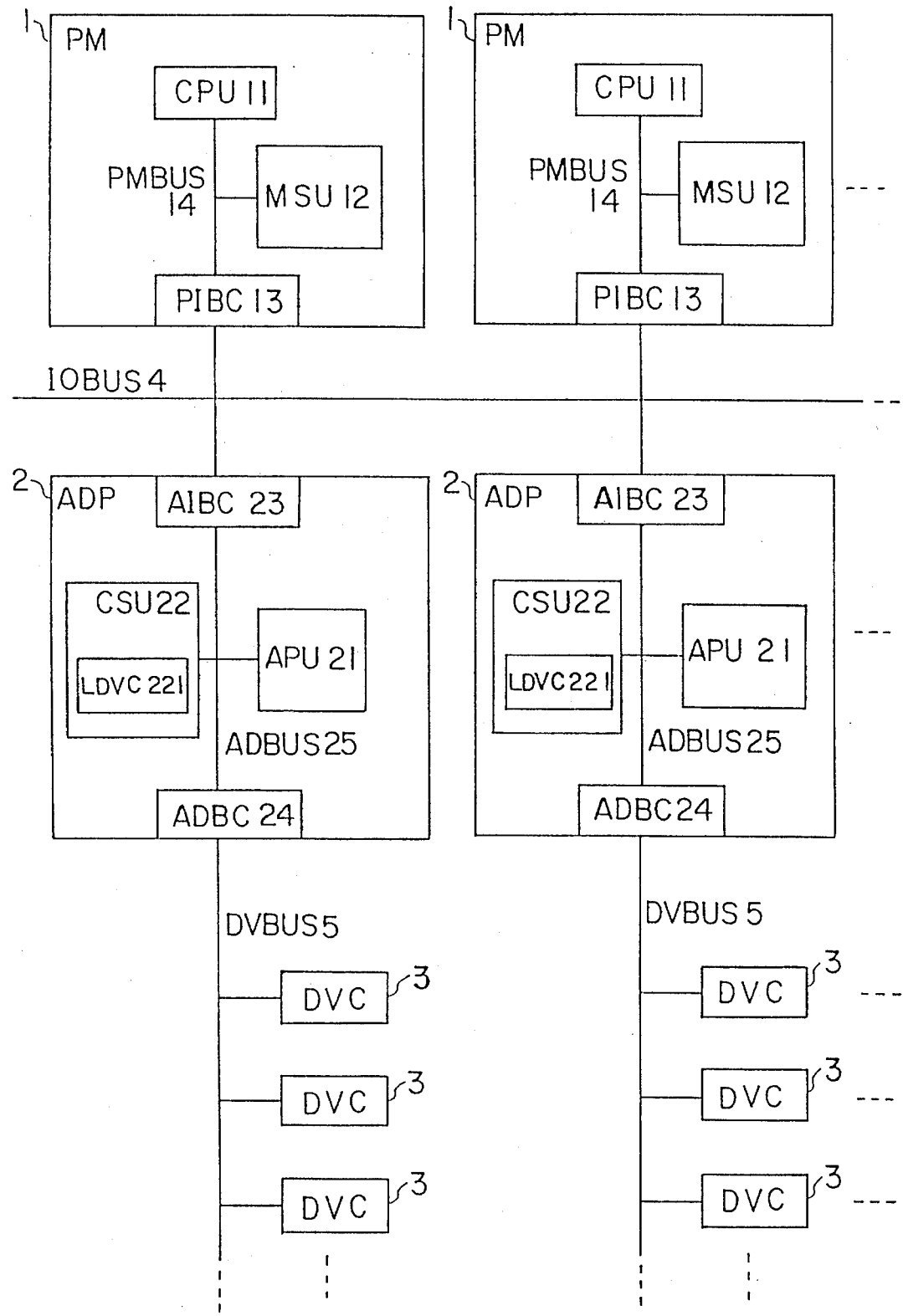
FIG. 4 is a block diagram of a first embodiment of the present invention.

As shown in FIG. 4, a multi-processor system of a first embodiment of the present invention comprises PMs 1, ADPs 2, DVCs 3, IOBUS 4, DVBUSes 5, CPUs 11, MSUs 12, PIBCs (PM-IOBUS connectors)13, PMBUSes (PM buses) 14, APUs 21, CSUs 22, AIBCs(ADP-IOBUS connectors) 23, ADBCs (ADP-DVBUS connectors) 24, ADBUSes (ADP buses) 25, and LDVCs (input/output request holding tables) 221.

CPU 11 in a discretional PM 1 executes a program stored in MSU 12 and performs a series of processes. When an instruction for requesting an input/output operation is executed in PM 1, CPU 11 designates necessary information such as the ADP 2 and DVC 3 which should be a subject of an input/output request and instructs PIBC 13 to ask the ADP 2 for the input/output operation.

PIBC 13 transmits the input/output request to AIBC 23 in ADP 2 through IOBUS 4. AIBC 23 notifies APU 21 that the input/output request is received and APU 21 stores the input/output request in LDVC 221 corresponding to the PM 1 issuing the input/output request and the subject DVC 3 and provided in CSU 22, and registers LDVC 221 in a queue for awaiting the input/output operation.

When DVBUS 5 is not in use and an input/output request is made for the DVC 3 which is not in use, APU 21 issues the input/output request for the DVC 3 in accordance with the sequence of the queue 222 and sequentially executes the input/output request held in LDVC 221.

FIGS. 5A to 5D show a format of control information used in the first embodiment of the present invention.

FIG. 5A represents an input/output instruction executed by a CPU in a PM, FIG. 5B shows a parameter of an input/output instruction, FIG. 5C shows a command for controlling an input/output, and FIG. 5D shows a status block for controlling an input/output.

The input/output command in FIG. 5A comprises an operation code (OP), the machine number of the ADP to be used (ADP #), the machine number of the DVC which is the subject of the access (DVC #) and the address of the parameter (Parameter Adrs) shown in FIG. 5B.

Parameters shown in FIG. 5B comprise an address (Command Adrs) for storing the command shown in FIG. 5B and an address (Status Blk Adrs) for the status block shown in FIG. 5D for storing completion information.

The command as shown in FIG. 5C includes an operation code (OP) such as read, write, seek, flag (flg), data count (Data Count) and data storing address in a main storage (LSU Adrs) and forms a channel program by combining a plurality of commands in a chain.

A status block as shown in FIG. 5D includes a status (Status) designating a completion status, a data count for the remaining data upon an abnormal completion and an address of a final command.

Figure 6:
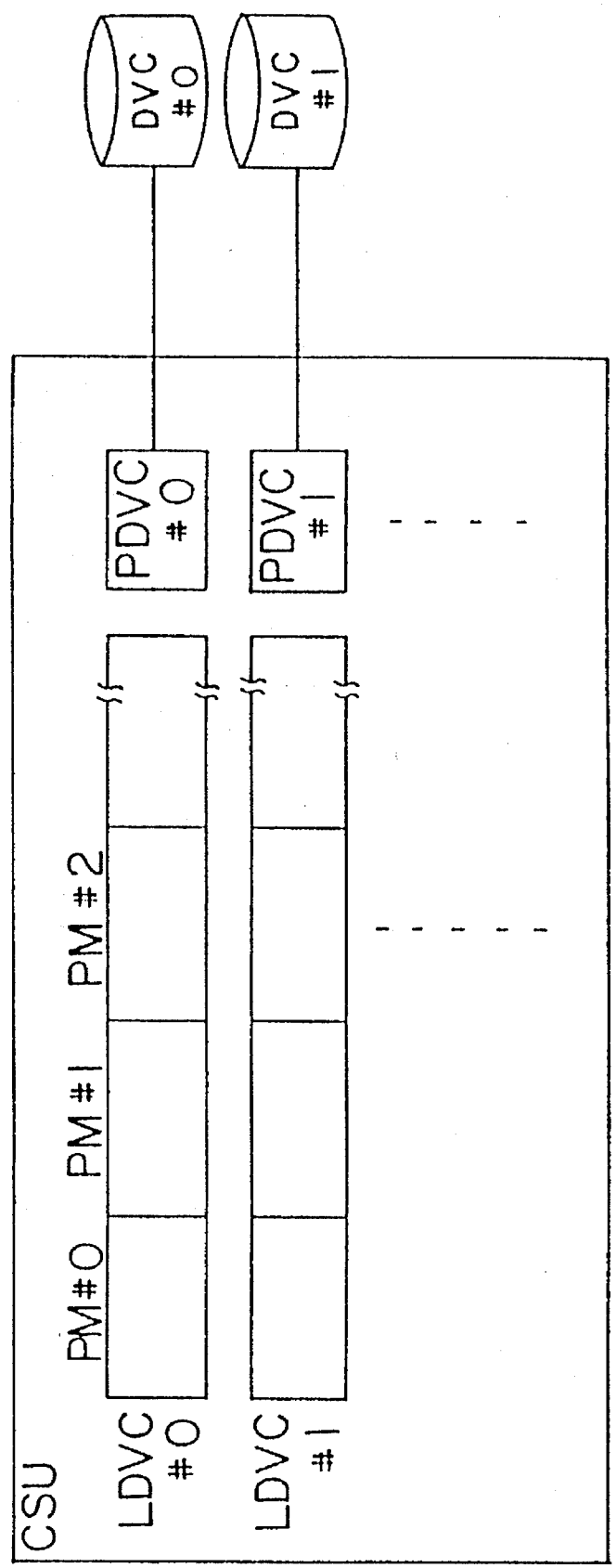
FIG. 6 is a diagram of a control table of the first embodiment.

FIG. 6 shows a control table for maintaining an input/output request in the first embodiment of the present invention.

The control table is provided corresponding to the DVC (#) and comprises LDVC and PDVC.

An LDVC comprises a table for managing input/output requests from respective PMs for a single DVC by entering them into a queue in the arriving sequence. PDVC comprises a table for managing the input/output request sequence when the input/output requests from a plurality of PMs arrive at a plurality of DVCs provided under the control of an ADP.

Figure 7:
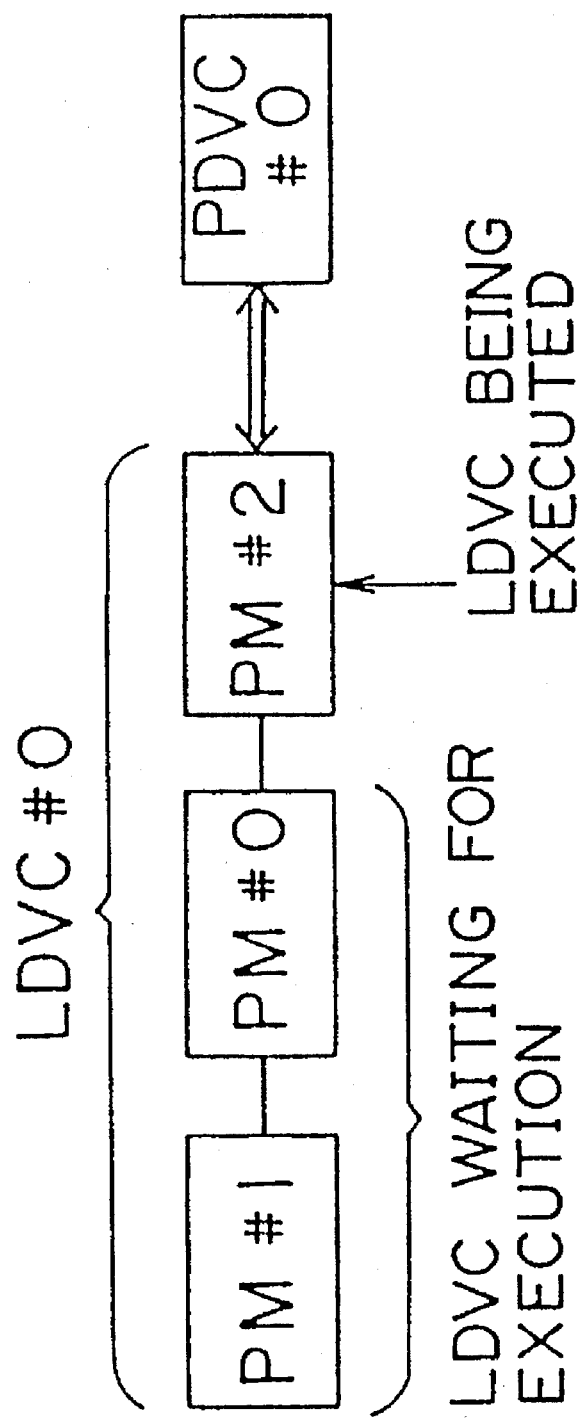
FIG. 7 is an explanatory view of a wait queue of an LDVC.

FIG. 7 shows an example of a queue of the LDVC. In this case, input/output request from PMs for a DVC#0 arrive at an ADP in the sequence PM#2, PM#0 and PM#1. Therefore, as shown in FIG. 7, a queue in which PM#2, PM#0 and PM#1 are linked in sequence beginning with PM#2 is formed for LDVC#0.

LDVC#0 is subjected to PDVC#0 and LDVC#0 is activated when PDVC#0 reaches a head of a queue of PDVC and comes in an executing state. At this time, input/output request PM#2, which is provided at the head of the queue of LDVC#0, comes in an executing state and input/output requests PM#0 and PM#1 come in an execution-awaiting.

When an execution of the input/output request from PM#2 is completed, a request of PM#2 is removed from the LDVC queue and instead PM#0 comes to the head of the LDVC queue. However, at this time, PDVC#0 is removed from the head of the PDVC queue and is made to wait for an execution. Therefore, the input/output request of PM#0 is kept waiting for an execution until PDVC#0 comes in the next executing state.

Figure 8:
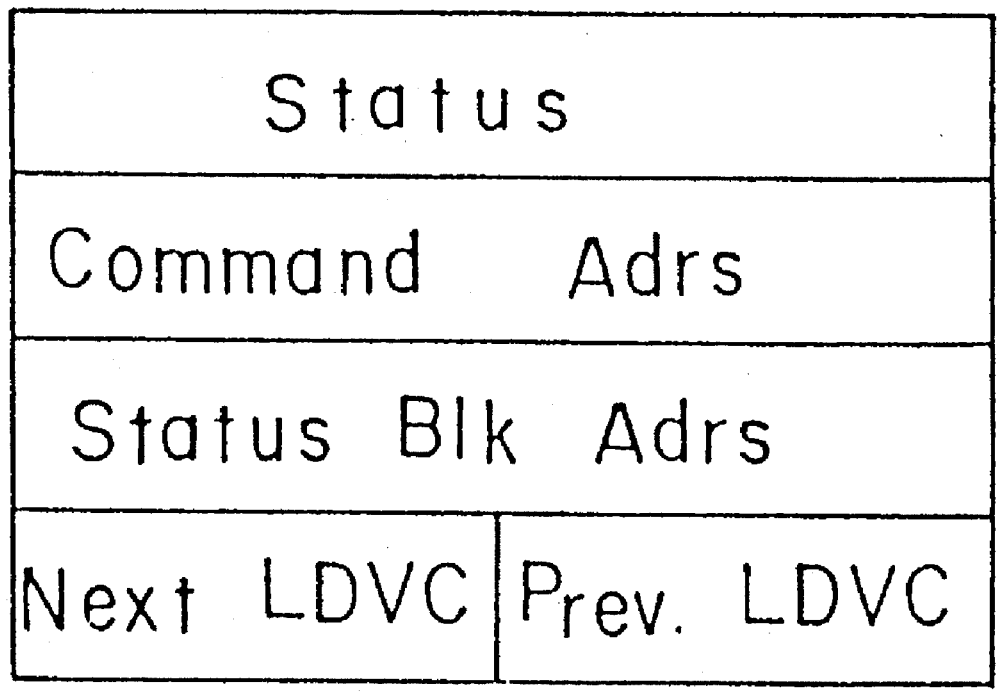
FIG. 8 is an explanatory view of a format of the LDVC.

FIG. 8 shows a format of LDVC. The following state information is possible for the status (Status) of the LDVC.

IDLE: nothing is done

WAIT: availability of the PDVC is awaited

Figure 19:
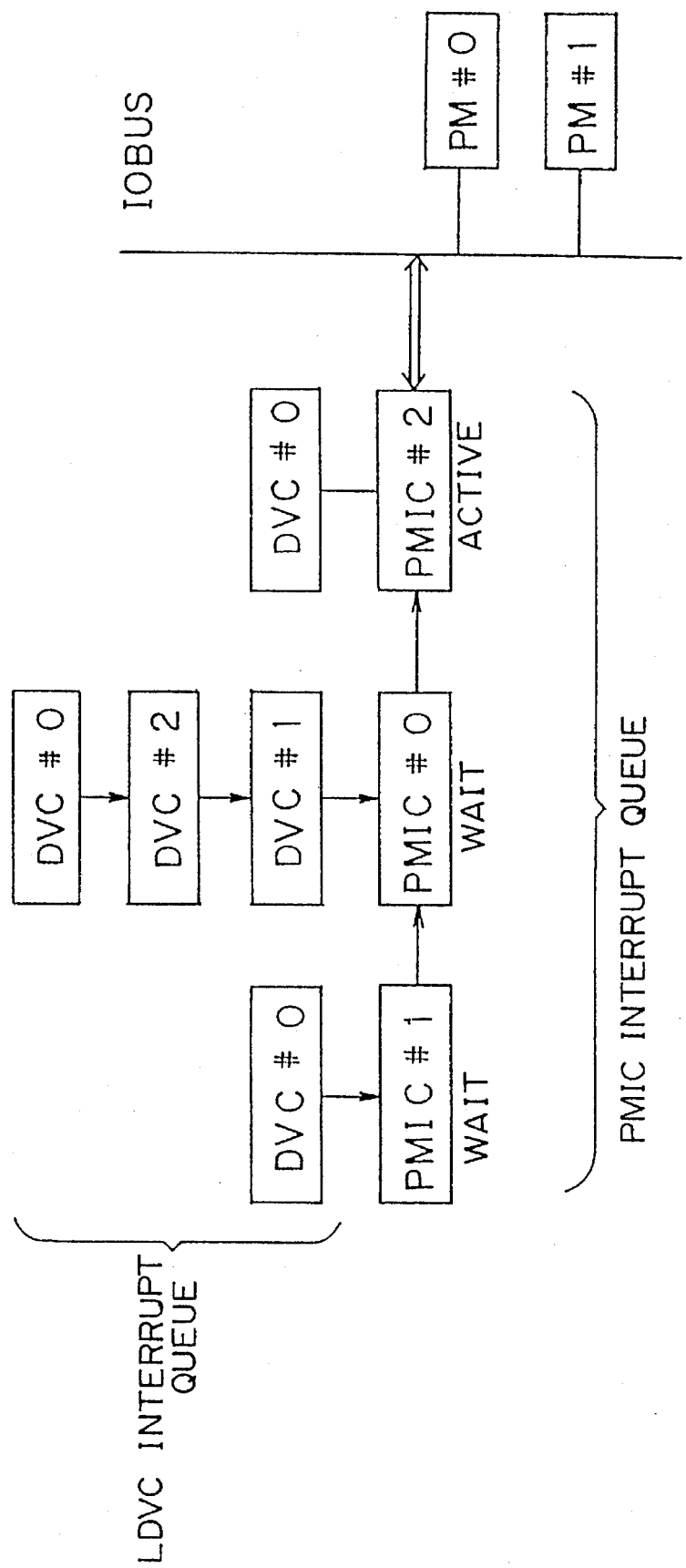
FIG. 19 is an explanatory view of an interrupt wait queue of the PMIC.

WORK: an input/output request comes at the head of the queue and executes the input/output operation IRQW: LDVC is connected to an interruption queue as shown in FIG. 19 and waits for the issuance of the IRQ bus command. When LDVC reaches the head of the interruption queue, i.e., LDVC reaches a head of the LDVC interruption queue and the head of PMIC interruption queue, an IRQ command is issued and the IRQW state is changed to IRQEX state. As described above, PMIC corresponds to PM.

IRQEX: LDVC reaches the head of an interruption queue and PMIC reaches the head of PMIC interruption queue. Thus, IRQ bus command is issued and a notification from PM as to whether IRQ bus command is accepted is awaited. If the notification of the acceptance of the interruption is yes, the state is changed to the state of IACKW and LDVC is removed from the interruption queue. If the notification of the acceptance of the interruption is no, PMIC is changed to be connected to the last of PMIC interruption queue and the state of IRQEX is returned to the state of IRQW.

IACKW: This shows that the interruption request is accepted by PM and ADP 2 waits for the IACK bus command. At this time, LDVC is not connected to the interruption queue and drive queue. The ADP 2 receives the IACK bus command and is returned to IDLE state and waits for a new I/O command.

In addition, an LDVC entry further comprises addresses (Command ADRS, Status Blk Adrs) of the command and the status block of the table, as shown in FIG. 5C and link information (Next LDVC, Prev. LDVC) for linking with the next and previous LDVC entries for forming a queue.

Figure 9:
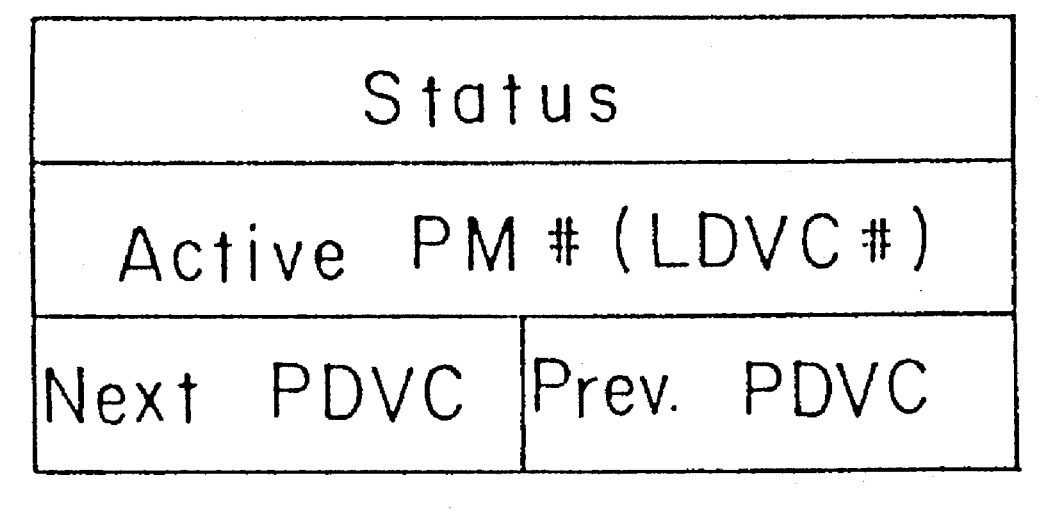

FIG. 9 designates a format of the PDVC.

IDLE: nothing is done (i.e., there isno LDVC in an executing state or a waiting state)

WAIT: the availability of DVBUS is awaited

WORK: an input/output operation is being executed

DISC: while the DVC is operating, DVBUS is open (i.e., disconnected)

The PDVC entry also has the machine number of the PM of the input/output request source (Active PM#) and the link information (Next PDVC and Prev. PDVC) for connecting the PDVC to the next or previous PDVC to form a queue.

Figure 10:
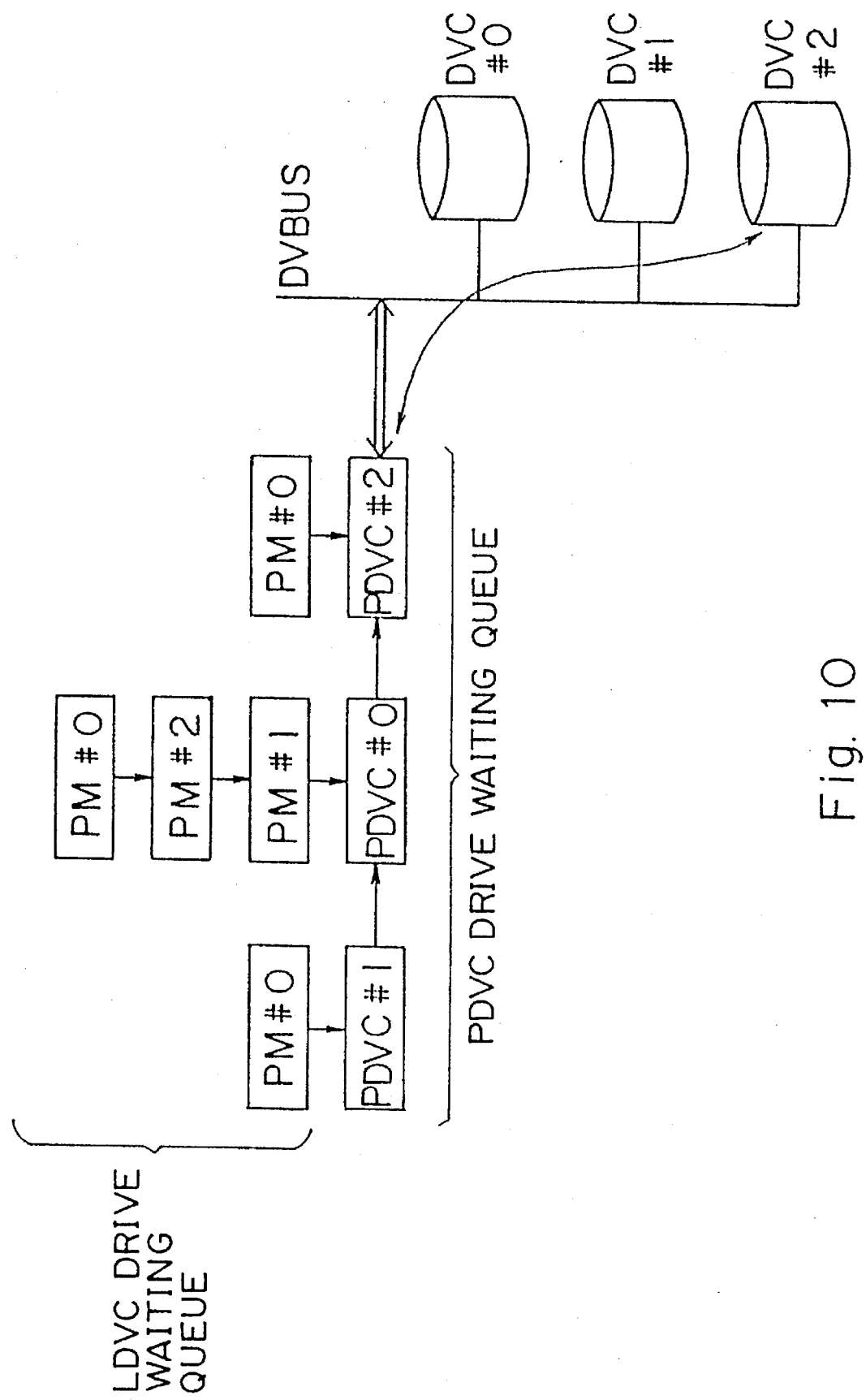
FIG. 10 is an explanatory view of a drive wait queue of the PDVC.

FIG. 10 shows an example of the queue of the PDVC. Input/output requests from PM#0, PM#1 and PM#2 are issued to DVC#0, DVC#1 and DVC#2 and are maintained in the LDVC 221. PDVC#2, PDVC#0 and PDVC#1 are connected to a queue in this order in accordance with an arriving sequence of input/output requests. The LDVC of PM #0 forms a queue for PDVC #1. LDVCs of PM#1, PM#2 and PM#0 form a queue for PDVC#0 and LDVC of PM#0 forms a queue for PDVC#1.

A process flow of a control program of an ADP 2 for processing an input/output request by using the PDVC 222 and LDVC 221 is explained by referring to FIGS. 11 to 14.

Figure 11:
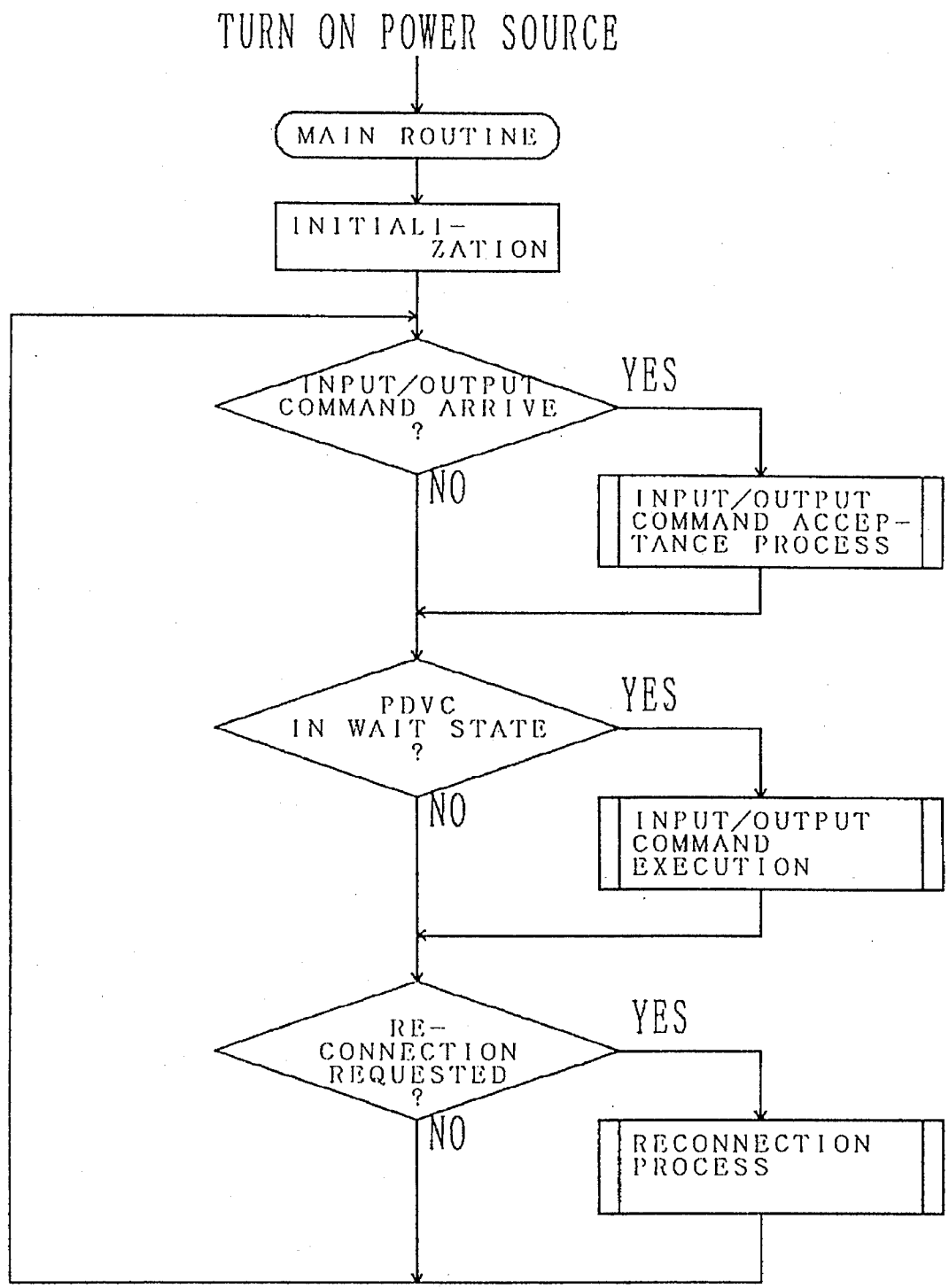
FIG. 11 is a flowchart of a main process of an ADP control program in the present invention.

FIG. 11 is a flowchart of a main process of the ADP control program. When the power source is turned on, an initialization process is performed and when an I/O (input/output) instruction comes from a PM, a process of receiving the I/O instruction is performed. When a PDVC is in a waiting state, the process waits until DVBUS between ADP-DVC becomes available, thereby executing the I/O command. The completion of this execution of the I/O command is performed by an interrupt process (described later) from ADP to PM. When the DVC transmits a reconnection request, their connection process is performed for the PDVC in the disconnected (Disc) state.

Figure 12:
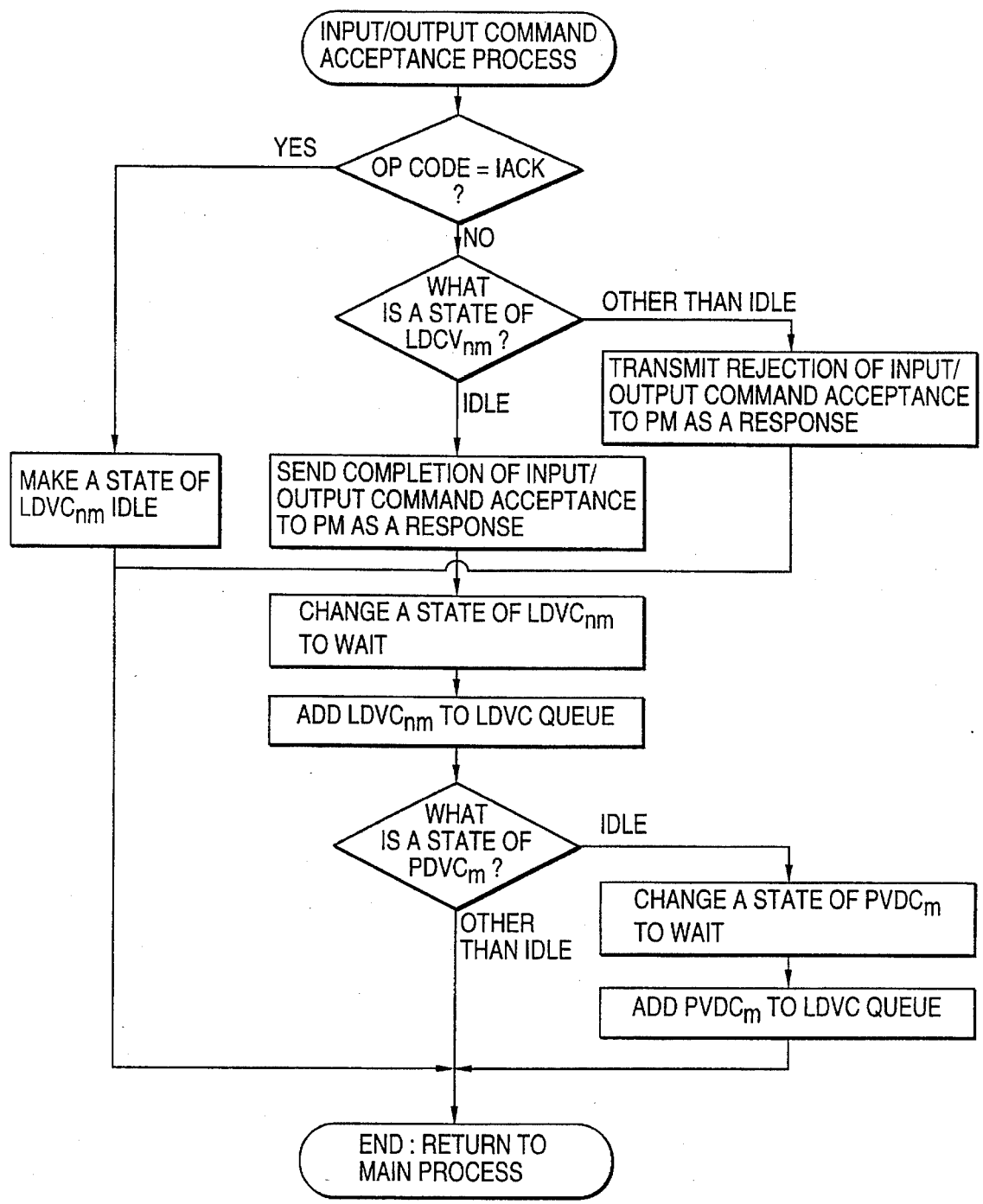
FIG. 12 is a flowchart of a process of an I/O command receipt.

FIG. 12 shows a flowchart of a process in which APU 21 of ADP 2 receives an I/O command.

When a request transmitted from a PMn to a DVCm arrives at ADP 2 and when OPCODE is not IACK (interrupt acknowledge), the request is judged as the I/O command, and the ADP 2 examines the state of the LDVCnm and sends an I/O command "receipt rejection" to PMn as a reply, in a state other than IDLE. When LDVCnm is IDLE, the process sends an I/O command "receipt completion" to PMn to change the state of LDVCnm to WAIT and add LDVCnm to the LDVC queue after storing parameter information in LDVCnm.

Next, the ADP examines the state of PDVCm and the process returns to the main process in states other than IDLE. In case of IDLE, the ADP changes the state of PDVC to WAIT and adds PDVCm to the PDVC queue, thereby returning to the main process shown in FIG. 11. When OPCODE is IACK, the interrupt request is accepted by PM, a state of LDVCnm is made empty, i.e., IDLE, thereby returning to the main process.

Figure 13:
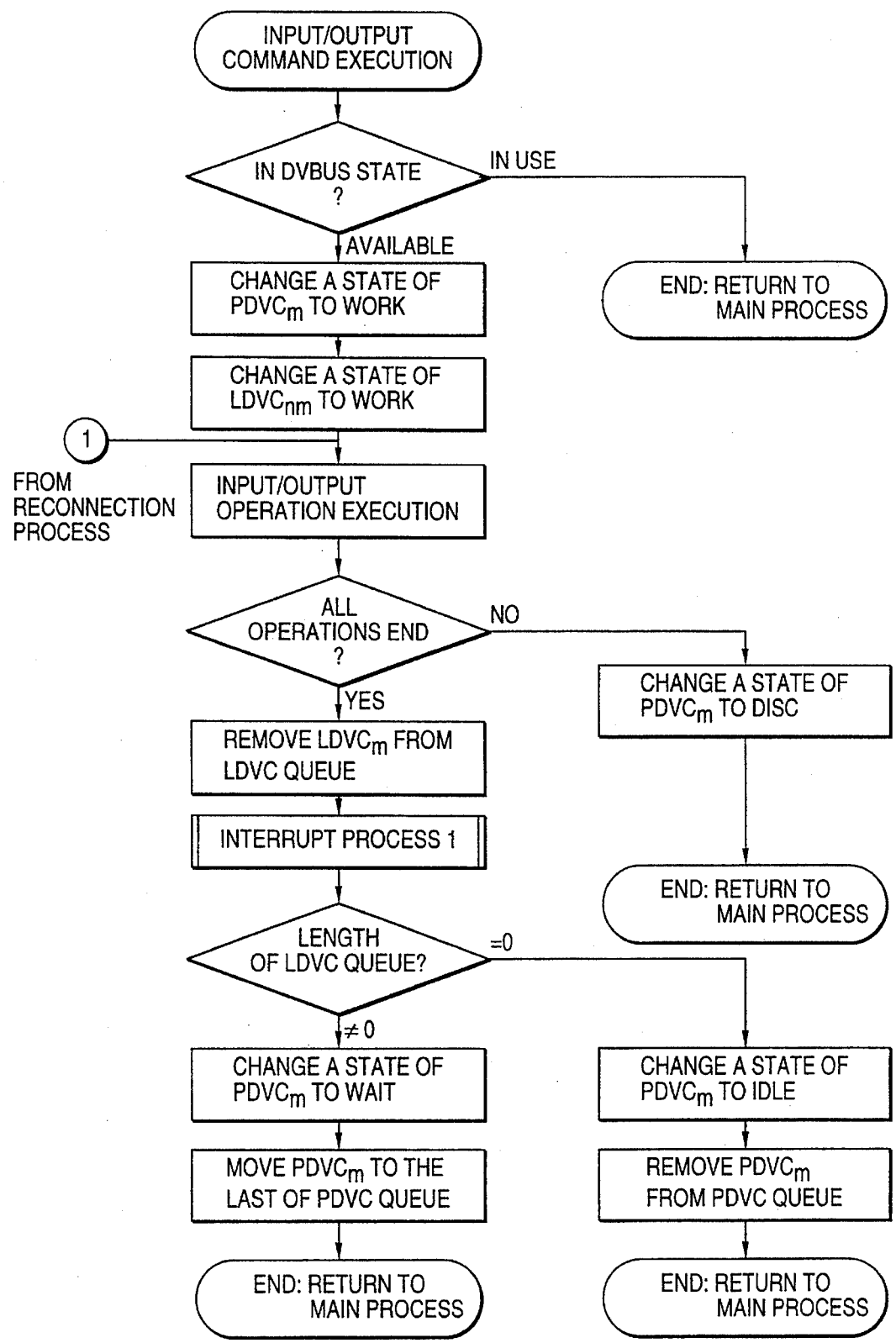
FIG. 13 is a flowchart of an I/O command execution.

FIG. 13 shows a flowchart of an I/O command execution. Reference character n designates the machine number of the PM and m designates the machine number of the DVC.

When the DVBUS is usable, the process changes the state of the PDVCm for DVCm and the state of LDVCnm from PMn to DVCm to Work. Next, the process executes an input/output operation. The input/output operation is executed by first sending a command to DVC, transferring data to DVC and examining whether the DVBUS is disconnected. Disconnection of the DVBUS occurs when all the input/output operations are not completed and when a DVC is temporarily disconnected during a mechanical operation of the DVC. When all the input/output processes are not completed, the state of PDVCm is changed to Disc and is removed from the queue and returned to the main process. When all the input/output operations are completed, LDVCm is removed from LDVC queue and the interrupt process 1 (shown in FIG. 20) is executed.

When the length of the LDVC drive queue is not 0, the state of PDVCm is changed to Wait and PDVCm is moved to the last of the PDVC drive queue and returned to the main process shown in FIG. 11. When the length of the LDVC drive queue is 0, the state of PDVCm is changed to Idle and PDVCm is removed from the PDVC drive queue and returned to the main process.

Figure 14:
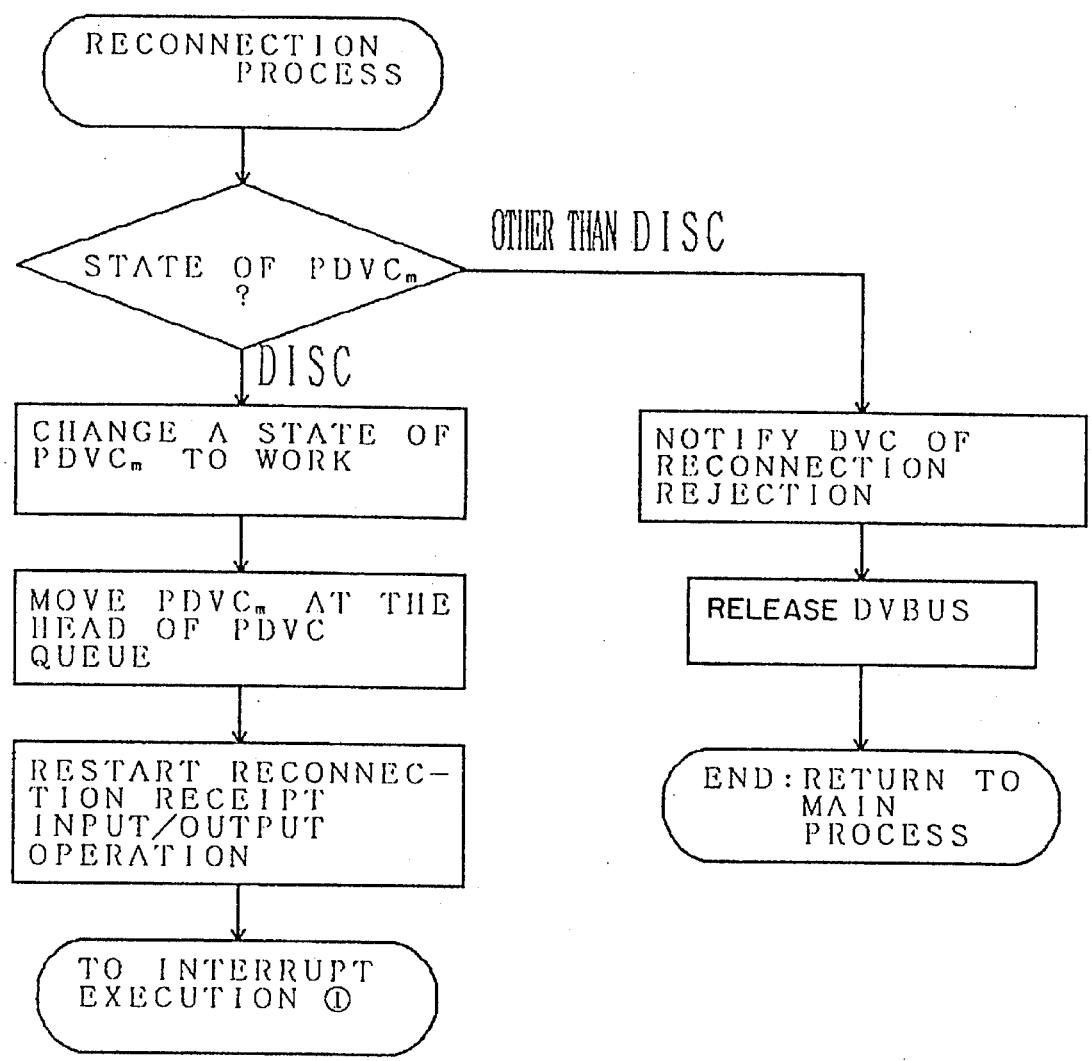
FIG. 14 is a flowchart of a reconnection process of the first embodiment.

FIG. 14 shows a flowchart of a reconnection process. When the DVCm in the disconnected state, makes a reconnection request, the process examines whether the state of the corresponding PDVCm is Disc. If it is other than Disc, the rejection of the reconnection is notified to DVC and the process is completed by releasing the DVBUS and returning to the main process shown in FIG. 11. If the state of PDVCm is Disc,.it is changed to Work, the PDVCm is moved to the head of the PDVC queue, the process receives the reconnection and reopens the input/output operation, and is returned to ① in the I/O command execution shown in FIG. 11.

According to the present invention, the access bus from respective PMs to the discretional DVC can be directly set through an ADP without going through other PM routes and the PM having issued the input/output request need not reissue the input/output request even if the DVC to be accessed is being used, and need not communicate with other PMs. This decreases the overhead and improves the performance of a multi-process system.

Figure 15:
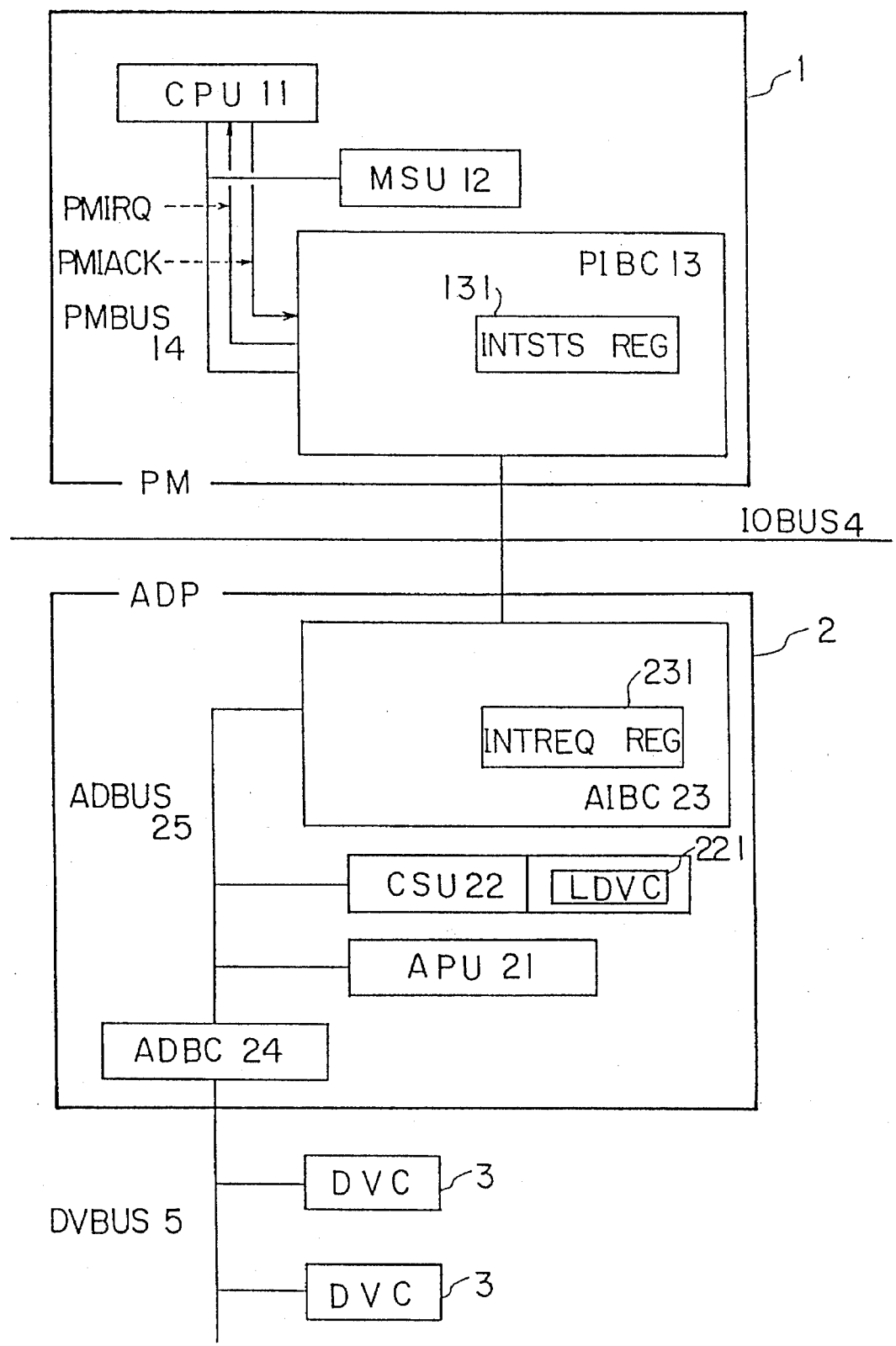
FIG. 15 is a block diagram of a second embodiment of the present invention.

As shown in FIG. 15, a multi-processor system of a second embodiment of the present invention comprises PM 1, ADP 2, DVC 3, IOBUS 4, DVBUS 5, CPU 11, MSU 12, PIBC (PM-IOBUS connector) 13, PMBUS (PM bus) 14, APU 21, CSU 22, AIBC (ADP-IOBUS connector) 23, ADBC (ADP-DVBUS connector) 24, ADBUS (ADP bus) 25, and LDVC (input/output request holding table) 221.

APU 21 in a discretional ADP 2 executes a program stored in CSU 22 and performs a series of processes. When an instruction for requesting an interrupt operation is executed in ADP 2, APU 21 designates necessary information such as which PM should be a subject of an interrupt request and instructs AIBC 23 to ask PIBC 13 of PM 1 for the interrupt operation.

AIBC 23 transmits the interrupt request to PIBC 13 in PM 1 through IOBUS 4. PIBC 13 notifies CPU 11 that the interrupt request is received and APU 21 stores the interrupt request in LDVC 221 corresponding to the DVC issuing the interrupt request and the subject DVC and provided in CSU 22, and registers LDVC 221 in a queue for awaiting the interrupt operation.

When DVBUS 5 is not in use and an interrupt request is made to a PM which is not available to process interrupt requests, APU 21 issues the interrupt request to the PM in accordance with the sequence of the queue and sequentially transmits the interrupt request held in LDVC 221 to CPU 11.

The above interruption operation will be described in more detail. The following are three kinds of definitions of a state of storing circuit INTSTS state register 131 provided in PIBC 13.

IDLE: This designates a state in which an interruption receipt is possible. PMIRQ (PM Interrupt Request) is off. When IRQ (Interrupt Request) bus command is received from ADP 2, this state is changed to an IRQ state.

IRQ: This designates a state in which an interruption request is reserved. PMIRQ is on. A new interruption from ADP 2 is not accepted. CPU 11 accepts an interruption and when PCMIACK (PM Interrupt Acknowledge) turns on, the state is changed to IACKW (Interrupt Acknowledge Wait).

IACKW: This designates a state in which IACK bus command transmission is reserved. PMIRQ is off. A new interruption from ADP 2 is not accepted. When PIBC accesses an I/O bus and an IACK bus command is transmitted, the state of INTSTS REG 131 is changed to IDLE. Thus, the PM comes to a state in which the interrupt is acceptable.

A mechanism of an interruption occurrence for a single PM is as follows.

When a DVCm transmits an interruption request to a PM, APU 21 (using firmware operating on the APU) previously stores the detailed interruption information in the area of MSU 12 designated by PM upon an issuance of an I/O command as a status block. APU 21 sets interruption information (such as ADP#, DVC#, PM# and interruption cause code) in an interruption production circuit (INTREQ REG) 231 in AIBC 23 and instructs AIBC 23 to allow the interruption to PM to start. AIBC 23 accesses the I/O bus and transmits a bus command (an IRQ bus command) of an interruption request to the designated PM. The above designated .interruption information is included in this bus command. When PIBC 13 receives an interruption command from AIBC 23, and INTSTS REG 131 is empty (i.e., in an Idle state), the interruption information is set in INTSTS REG 131 and interruption request (PMIRQ) to CPU 11 turns on and notifies ADP 2 of the interruption receipt. When INTSTS REG 131 is not empty, ADP 2 is notified that the interruption is not accepted. These notifications are transmitted to ADP 2 through a response signal line of IOBUS 4. This response signal line is transmitted to a unit on a transmitting side by a unit on a receiving side upon receiving the bus command.

The content of the response signal of AIBC 23 is notified to APU 21 through an interruption to APU 21. APU 21 can thus determine whether the interruption transmission is successful. When the interruption transmission fails, the interruption request is tried again later.

When PMIRQ is on, and the interruption receipt is possible, PMIACK turns on, thereby executing the interruption operation. Whether the interruption receipt is possible depends on a state of an interruption mask in CPU 11. This is a well known technology. A software may sometimes run for a long time in an interruption prohibition state. In this case, INTSTS REG 131 is maintained in this state (i.e., in the state of IRQ).

When PMIACK turns on, PIBC 13 turns off the PMIRQ and accesses the IOBUS 4 by putting INTSTS REG 131 into an IACKW state in which IACK transmission is waited and transmits a bus command (IACK bus command) for the interruption receipt to ADP 2. When the transmission of the bus command is completed, INTSTS REG 131 is returned to an IDLE state and thus a receipt of a new interruption becomes possible.

When AIBC 23 receives IACK, as shown in FIG. 12, it notifies APU 21 by an interruption operation, for example. APU 21 returns LDVC 221 to a state of IDLE when it receives IACK.

Figure 16:
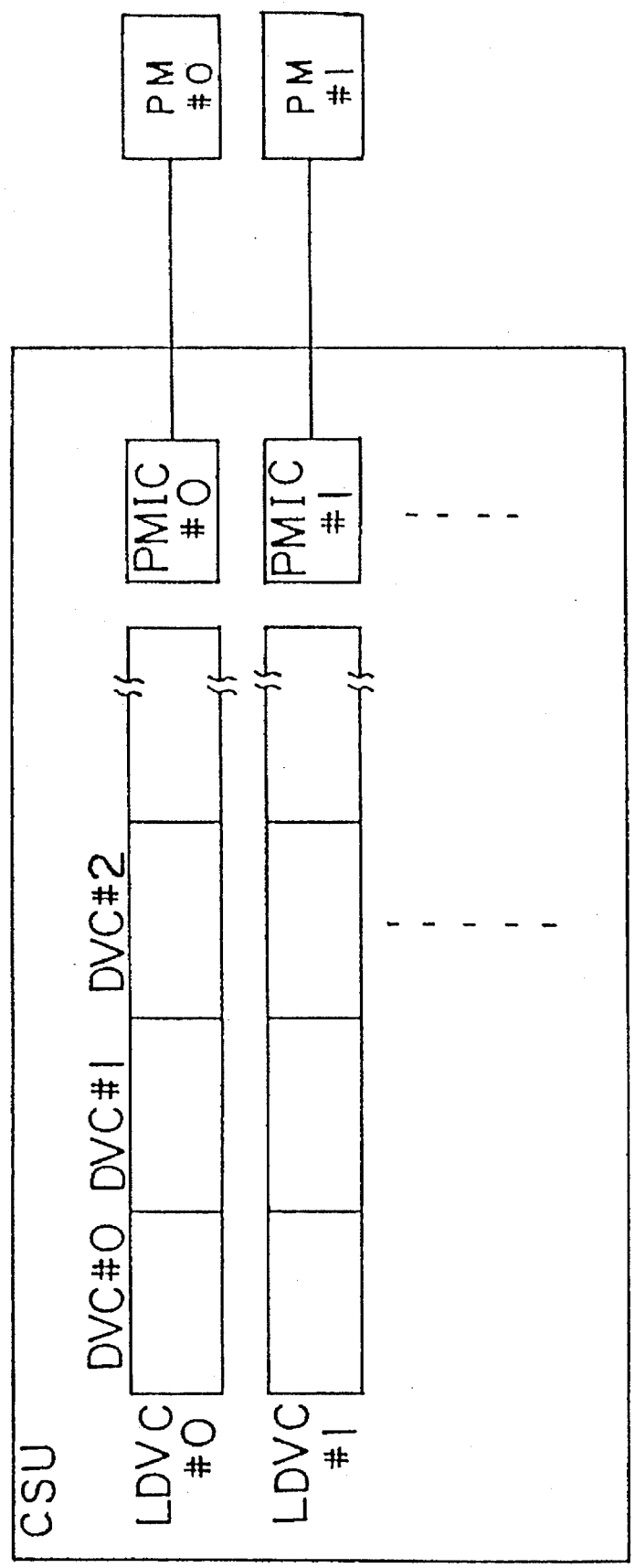
FIG. 16 is a block diagram of a control table of the second embodiment.

FIG. 16 shows a control table for maintaining an interrupt request in the second embodiment of the present invention.

The control table is provided corresponding to the PM (#) and comprises LDVC and PMIC.

An LDVC comprises a table for managing interrupt requests from respective DVCs to a single PM by entering them into a queue in the arriving sequence. PMIC comprises a table for managing the sequence of the process of the interrupt requests when the interrupt requests from a plurality of DVCs arrive at a plurality of PMs.

Figure 17:
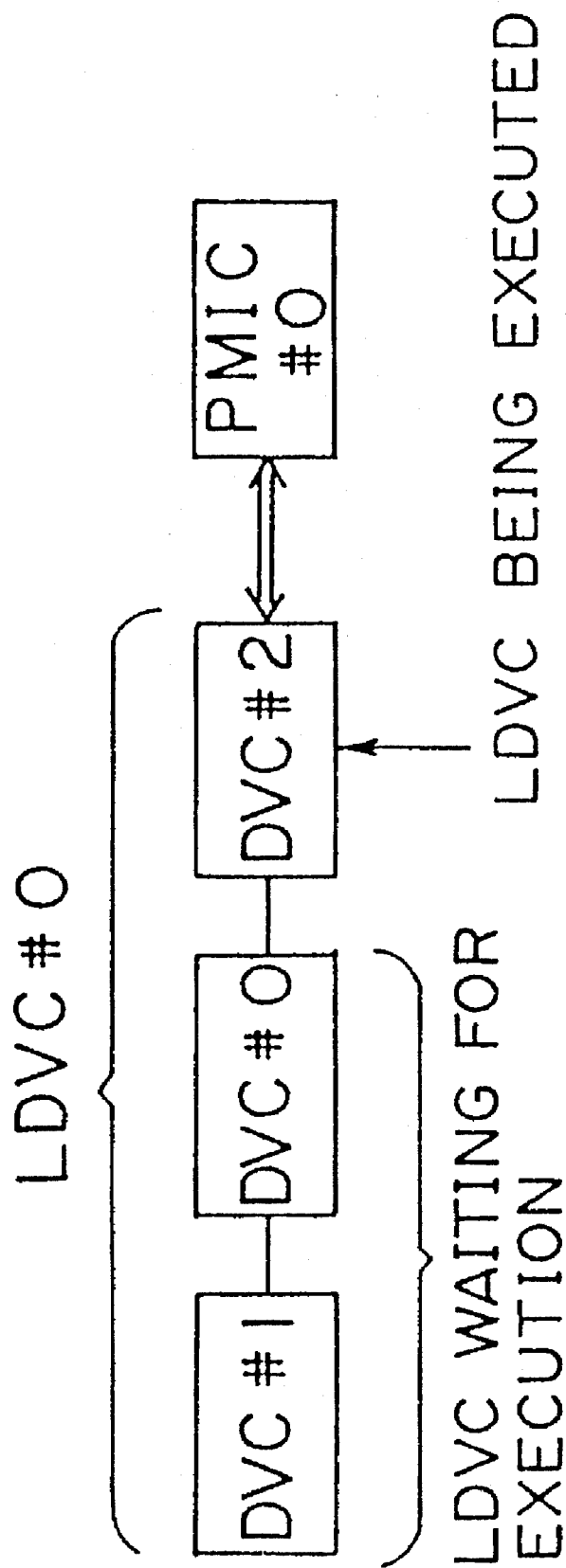
FIG. 17 is an explanatory view of a queue of the LDVC.

FIG. 17 shows an example of a PM interrupt queue 224 of the LDVC. In this case, interrupt request from DVCs to PM#0 arrive at an ADP in the sequence DVC#2, DVC#0 and DVC#1. Therefore, as shown in FIG. 17, a queue in which DVC#2, DVC#0 and DVC#1 are linked in sequence beginning with DVC#2 is formed for LDVC#0.

LDVC#0 is subjected to PMIC#0 and PMIC#0 is activated when PMIC#0 reaches a head of a queue of PMIC and comes in an executing state. At this time, interrupt request DVC#2, which is provided at the head of the queue of PMIC#0, comes in an executing state and interrupt requests DVC#0 and DVC#1 come in a state of waiting for an execution.

When an execution of the interrupt request from DVC#2 is completed, a request of DVC#2 is removed from the LDVC queue and instead DVC#0 comes to the head of the LDVC queue. However, at this time, PMIC#0 is removed from the head of the PMIC queue and is made to wait for execution. Therefore, the interrupt request of DVC#0 is kept waiting for execution until PMIC#0 comes in the next executing state.

A format and state of the LDVC used regarding the interrupt request are the same as described above with regard to the I/O command.

FIG. 18 designates a format of the PMIC which has the following states.

IDLE: This status shows that LDVC is awaiting an interruption to a particular PM exist, i.e., in the state of IRQW (Interrupt Request Wait)/IRQ (Interrupt Request Execute)

WAIT: This state shows that LDVC of IACKW (Interrupt Acknowledge Wait) exists and PMIC waits for availability of AIBC 23. IACKW designates a state in which an interrupt request is accepted by a PM and IACK is awaited.

ACTIVE: This state shows that the PM has a right to control AIBC 23. The head LDVC connected to the PMIC is in the state of IRQEX.

The PMIC has the machine number of the DVC of the interrupt request source (Active LDVC#) and the link information (Next PMIC and Prev.PMIC) for connecting the PMIC to the next or previous PMIC to form a queue.

FIG. 19 shows an example of the interrupt queue of the PMIC. Interrupt requests from DVC#0, DVC#1 and DVC#2 are issued to PM#0, PM#1 and PM#2 and are maintained in the LDVC. PMIC#2, PMIC#0 and PMIC#1 are connected to a queue in this order in accordance with an arriving sequence of interrupt requests. The LDVC of DVC #0 forms a queue for PMIC #1. LDVCs of DVC#1, DVC#2 and DVC#0 form a queue for PMIC#0 and LDVC of DVC#0 forms a queue for PMIC#1.

Figure 20:
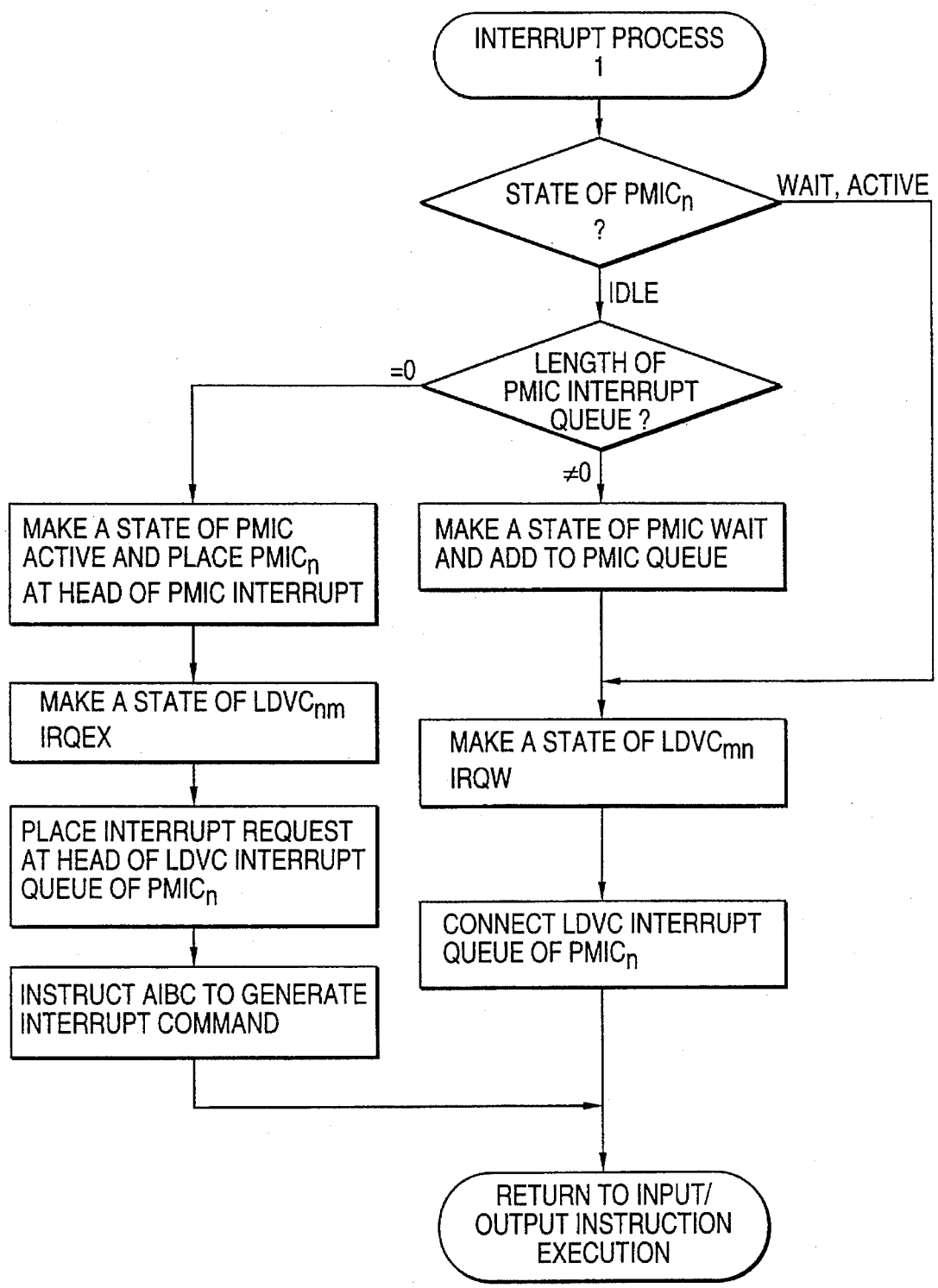
FIG. 20 is a flowchart of an interrupt process 1 in the second embodiment.
Figure 21:
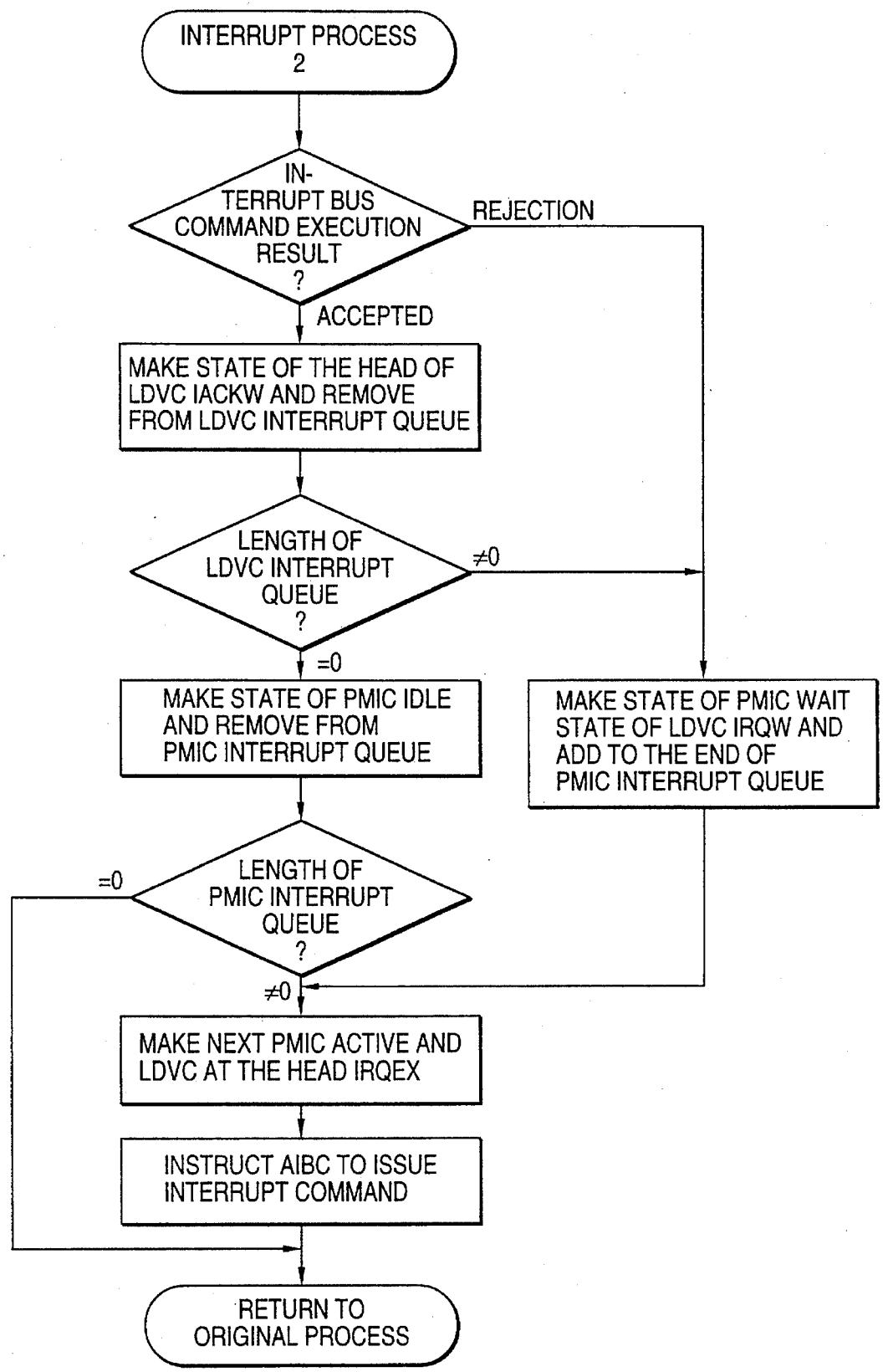
FIG. 21 is a flowchart of an interrupt process 2 in the second embodiment.

FIGS. 20 and 21 show flowcharts of the interruption process.

As shown in FIG. 20, an interruption process 1 first determines the state of PMICn when PMICn is Idle. Then the process determines the length of a PMIC interrupting queue. When the length of the queue is not 0, the state of PMIC is made Wait and PMIC enters the PMIC queue. Then the state of LDVCnm is made IRQW and is added to the LDVC interruption queue 224 of PMICn. When the length of the PMIC interrupting queue is 0, the state of PMIC is made ACTIVE and PMIC is placed at the head of the PMIC queue. Then the state of LDVCnm is made IRQEX. Next, the interrupt request from DVC#m is placed at the head of the LDVC interruption queue 224 of PMICn. The process asks AIBC 23 to issue an interruption command. Then the process returns to I/O instruction execution. When the state of PMICn is Wait or ACTIVE, the process turns directly the state of LDVCnm to IRQW.

Interruption process 2 is activated by an interrupt from AIBC to APU 21 and by notification of a result of an interrupt bus command. As shown in FIG. 21, interruption process 2 determines the result of an execution of an interruption bus command. When the interruption bus command execution is accepted, the state of LDVC at the head is IACKW and is removed from the LDVC interrupt queue 224 for PMICn. When the length of the LDVC interrupt queue 224 for PMICn is 0, the state of PMICn is made Idle and PMICn is removed from the PMIC interrupt queue. Then the process determines the length of the PMIC interrupt queue. When the length of the PMIC interrupt queue is not 0, the state of the next PMICn+1 is made ACTIVE and the LDVC at the head of the PMICn+1 interrupt queue is made IRQEX. Then the process instructs AIBC to issue an interrupt command, thereby returning to the original process. When the length of the PMIC interrupt queue is 0, the process is directly returned to the original one. When the length of the LDVC interrupt queue 224 for PMICn+1 is not 0 or the result of the interrupt bus command execution is rejection, the state of PMIC is also made WAIT, and the state of LDVC is made IRQW and is added to the end of the PMIC interrupt queue.

According to the present invention, as is described above, respective PMs can directly determine an access path to a discretional DVC through an ADP without going through other PMs and it is not necessary for the PM issuing input/output request to reissue the input/output request even if the DVC to which an access is made is being used and it is also not necessary to communicate with other PMs, thereby decreasing overhead and increasing a performance of a multi-processor system. Further, the present invention can decrease occurrence of a state of waiting for an interrupt to other PMs depending on whether the interrupt to a particular PM is accepted, when the interrupt request from respective DVCs to the PM is processed, thereby preventing the processing performance of a multi-processor system from being decreased.

What is claimed is:

1. An input/output request control system in a multiprocessor system including a plurality of information processing modules, each having a main memory, said input/output request control system comprising:
   a plurality of input/output devices divided into groups;
   a plurality of input/output adapters operatively connected to and commonly used by each of the information processing modules, each of said input/output adapters operatively connected to one of the groups of said input/output devices and including—
   input/output request table means for managing input/output requests from the information processing modules to said input/output devices in a corresponding group, using device request queues corresponding to said input/output devices, at least one drive queue determining an order of access to said input/output devices by selecting from among said device request queues for the groups of said input/output devices controlled by said input/output adapters, and an input/output request table having rows of cells, the rows corresponding to said input/output devices in the corresponding group, the cells corresponding to the information processing modules, the input/output request table storing the input/output requests from the information processing modules in respective cells of a row corresponding to one of said input/output devices to which the input/output requests are directed, thereby forming a device drive queue having a predetermined order; and
   request processing means for processing input/output requests from said information processing modules based on contents of the input/output request table and status of said input/output devices.

2. The input/output request control system according to claim 1, wherein said input/output request table means further includes use of group drive queues corresponding to the groups of said input/output devices, and when a selected input/output request reaches the head of a corresponding device drive queue, the selected input/output request enters a corresponding group drive queue and when the selected input/output request comes to the head of the corresponding group drive queue, an execution of the selected input/output request starts.

3. The input/output request control system according to claim 2, wherein said input/output request table means further includes use of processing module interrupt queues and adapter interrupt output queues and the cells of said input/output request table have states selected from IDLE in which no unexecuted requests have been received for a corresponding cell; WAIT in which availability of the corresponding group drive queue is awaited; WORK in which the selected input/output request comes to the head of the corresponding group drive queue and the selected input/output request is executed; IRQW in which the selected input/output request is entered into a corresponding processing module interrupt queue and awaits a turn to issue an interrupt request bus command; IRQEX when the selected input/output request reaches the head of a corresponding adapter interrupt output queue, so that the interrupt request bus command is issued and notification of acceptance by a corresponding information processing module is awaited; and IACKW in which the interrupt request bus command is accepted by the corresponding information processing module and an acknowledgement bus command is awaited by a corresponding input/output adapter, whereby the selected input/output request is associated with the interrupt request bus command relating to completion of execution of the selected input/output request.

4. The input/output request control system according to claim 2,
   further comprising device buses connecting the groups of said input/output devices to corresponding input/output adapters, and
   wherein entries in the group drive queues have states selected from IDLE in which no input/output requests are waiting in the corresponding device drive queue; WAIT in which availability of a corresponding device bus is awaited; WORK in which the selected input/output request is executed; and DISC in which the one of said input/output devices is operating and the corresponding device bus is disconnected.

5. The input/output request control system according to claim 2, wherein said input/output adapters each comprises:
   acceptance means for accepting a new input/output request when the new input/output request arrives;
   execution means for executing the selected input/output request when the selected input/output request reaches the head of the corresponding group drive queue with a WAIT state and for performing an interrupt operation to one of the information processing modules upon completion of the selected input/output request; and
   reconnection means for performing a reconnection process when a reconnection request is made.

6. The input/output request control system according to claim 5, wherein said acceptance means comprises:
   means for rejecting acceptance of the new input/output request when a previous input/output request represented in a corresponding cell in the input/output request table has not completed execution and acknowledgement;
   means for responding to one of the information processing modules by indicating acceptance of the new input/output request when the new input/output request is not an acknowledgment and the corresponding cell in the input/output request table is in an IDLE state;
   means for changing the corresponding cell in the input/output request table to a WAIT state and adding the corresponding cell in to the device drive queue:
   means for changing a corresponding entry in the group drive queue to the WAIT state when the corresponding entry in the group drive queue is in an IDLE state; and
   means for setting the corresponding cell in the input/output request table to an interrupt state IDLE when the acknowledgement is received from the one of the information processing modules for operation of one of said input/output devices.

7. The input/output request control system according to claim 5,
   further comprising device buses connecting the groups of said input/output devices to corresponding input/output adapters, and
   wherein said execution means comprises:
   means for changing a state of the entry at the head of the group drive queue to WORK when a corresponding device bus is available and changing a state of a corresponding cell in the input/output request table to WORK;
   means for executing an input/output operation in dependence upon the selected input/output request;
   means for changing the state of the entry at the head of the group drive queue to DISC when the input/output operation is not completed and removing the entry at the head of the group drive queue;

interrupt process means for removing the corresponding cell in the input/output request table from the device drive queue and performing an interrupt process when all input/output operations associated with the selected input/output request are completed;

means for changing the sate of the entry at the head of the group drive queue to IDLE when the device drive queue corresponding thereto has a length of 0 and removing the entry at the head of the group drive queue; and means for changing the state of the entry at the head of the group drive queue to WAIT when the length of the corresponding device drive queue is not 0 upon completion of all input/output operations for the selected input/output request and adding the entry at the head of the group drive queue to the tail of the group drive queue.

8. The input/output request control system according to claim 7, wherein said input/output request table means further includes use of processing module interrupt queues and adapter interrupt output queues associated with a processor module interrupt control table, and wherein said interrupt process means comprises:

means for judging a length of a corresponding adapter interrupt output queue;

means for adding a selected interrupt request to a corresponding processor module interrupt queue of the processor module interrupt control table when the length of the corresponding adapter interrupt output queue is not 0; and means for placing the selected interrupt request at the head of the corresponding adapter interrupt output queue and the head of the corresponding processing module interrupt queue when the length of the corresponding adapter interrupt output queue is 0 and for instructing that an interrupt command be issued.

9. The input/output request control system according to claim 7, wherein said input/output request table means further includes use of processing module interrupt queues and adapter interrupt output queues, and wherein said interrupt process means comprises:

means for removing the entry at the head of the corresponding processing module interrupt queue when the interrupt process includes an interrupt bus command which is accepted;

means for removing an entry from the corresponding adapter interrupt output queue when the length of the corresponding processing module interrupt queue is 0;

means for making the state of a following entry in the corresponding adapter interrupt output queue ACTIVE when the length of the corresponding adapter interrupt output queue is not 0, making the state of the head of the corresponding processing module interrupt queue IRQEX and issuing the interrupt bus command;

means for returning to an original process when the length of the corresponding adapter interrupt output queue is 0; and means for moving the entry at the head to the end of the corresponding adapter interrupt output queue when the interrupt bus command is not accepted and when the length of the corresponding processing module interrupt queue is not 0 after acceptance of the interrupt bus command.

10. An interrupt request control system in a multiprocessor system including a plurality of information processing modules, each having a main memory, said interrupt request control system comprising:

a plurality of input/output devices divided into groups;

a plurality of input/output adapters operatively connected to and commonly used by each of the information processing modules, each of said input/output adapters corresponding to one of the groups of said input/output devices and including— interrupt request table means for managing interrupt requests from said input/output devices to the information processing modules using at least one queue sequenced in order of access to said input/output bus and an interrupt request table having rows and columns of cells, each row corresponding to said input/output devices in a corresponding group and each column corresponding to the information processing modules, said interrupt request table means storing interrupt requests from said input/output devices to one of the information processing modules in a row of cells in the interrupt request table, corresponding to the one of the information processing modules, thereby forming a processor module interrupt queue having a predetermined order; and interrupt process means for processing interrupt requests from said input/output devices based on contents of the interrupt request table and status of said input/output devices.

11. The interrupt request control system according to claim 10, wherein the interrupt request tables are provided corresponding to the information processing modules, and wherein said interrupt request table means further includes use of an input/output request table for storing input/output requests and the at least one queue includes processing module interrupt queues and at least one adapter interrupt output queue, and when a selected interrupt request reaches the head of a corresponding processing module interrupt queue, the selected interrupt request at the head of the corresponding processing module interrupt queue enters the adapter interrupt output queue and when the selected interrupt request comes to the head of the adapter interrupt output queue, interrupt execution starts.

12. The interrupt request control system according to claim 11, wherein the at least one queue includes group drive queues and device drive queues and cells in the input/output request table have states selected from IDLE in which no unexecuted requests have been received for a corresponding cell; WAIT in which availability of a corresponding group drive queue is awaited; WORK in which the a selected input/output request comes to the head of the corresponding group drive queue and the selected input/output request is executed; IRQW in which the selected input/output request is entered into a corresponding processing module interrupt queue and awaits a turn to issue an interrupt request bus command; IRQEX when the selected input/output request reaches the head of a corresponding adapter interrupt output queue, so that the interrupt request bus command is issued and notification of acceptance by a corresponding information processing module is awaited; and IACKW in which the interrupt request bus command is accepted by the corresponding information processing module and an acknowledgement bus command is awaited by a corresponding input/output adapter.

13. The interrupt request control system according to claim 11, further comprising device buses connecting the groups of said input/output devices to corresponding input/output adapters, and wherein entries in the group drive queues have states selected from IDLE in which no input/output requests are awaiting in a corresponding device drive queue; WAIT in which availability of a corresponding device bus is awaited; and WORK in which a selected input/output request is executed.

14. The interrupt request control system according to claim 10, wherein the at least one queue includes processing module interrupt queues and adapter interrupt output queues, and wherein said interrupt process means comprises:

means for judging a length of a corresponding adapter interrupt output queue when a selected interrupt request in a corresponding interrupt request table is IDLE;

means for setting the state of the selected interrupt request to WAIT, adding the selected interrupt request to a corresponding adapter interrupt output queue and a corresponding processing module interrupt queue when the length of the corresponding adapter interrupt output queue is not 0;

means for placing the selected interrupt request at the head of the corresponding adapter interrupt output queue and the corresponding processing module interrupt queue when the length of the corresponding adapter interrupt output queue is 0 and for instructing that an interrupt bus command be issued; and means for adding the selected interrupt request to the corresponding processing module interrupt queue when the state of the selected interrupt request is WAIT or ACTIVE.

15. The interrupt request control system according to claim 10, wherein the at least one queue includes processing module interrupt queues and adapter interrupt output queues, and wherein said interrupt process means comprises:

means for removing the entry at the head of a corresponding processing module interrupt queue when a selected interrupt request produces an interrupt bus command which is accepted;

means for removing a an entry from a corresponding adapter interrupt output queue when the length of the corresponding processing module interrupt queue is 0;

means for making the state of a following entry in the corresponding adapter interrupt output queue ACTIVE when the length of the corresponding adapter interrupt output queue is not 0, making the state of the head of the corresponding processing module interrupt queue IRQEX and issuing the interrupt bus command;

means for returning to an original process when the length of the corresponding adapter interrupt output queue is 0; and means for moving the entry of the head to the end of the corresponding adapter interrupt output queue when the interrupt bus command is not accepted and when the length of the corresponding processing module interrupt queue is not 0 after acceptance of the interrupt bus command.

\* \* \* \* \*

UNITED STATES PATENT AND TRADEMARK OFFICE
CERTIFICATE OF CORRECTION

PATENT NO. : 5,507,032
DATED : April 9, 1996
INVENTOR(S) : Makoto KIMURA

It is certified that error appears in the above-indentified patent and that said Letters Patent is hereby corrected as shown below:

Column 2, line 52, change "PM" to --$PM_s$--.

Column 4, line 17, change "structural view" to --block diagram--; and line 19, change "shows" to --is--.

Column 5, line 20, after "221", please insert --and--; and line 27, change "A" to --An--.

Column 8, line 21, change "isno" to --is no--; and line 55, change "(Disc) state" to --state (Disc)--.

Column 9, line 41, delete ".".

Column 10, line 48, delete ".".

Column 11, line 54, before "in" insert --not--.
Column 12, line 60, delete --a--.

Signed and Sealed this

Twenty-fourth Day of September, 1996

Attest:

BRUCE LEHMAN

*Attesting Officer*     *Commissioner of Patents and Trademarks*